(12) United States Patent
Quiroga et al.

(10) Patent No.: US 7,447,683 B2
(45) Date of Patent: Nov. 4, 2008

(54) NATURAL LANGUAGE BASED SEARCH ENGINE AND METHODS OF USE THEREFOR

(75) Inventors: Martin A. Quiroga, Kansas City, MO (US); John A. DeSanto, Kansas City, MO (US); John S. Flowers, Mission, KS (US)

(73) Assignee: Jiles, Inc., Los Angeles, CA (US)

( * ) Notice: Subject to any disclaimer, the term of this patent is extended or adjusted under 35 U.S.C. 154(b) by 338 days.

(21) Appl. No.: 11/117,186

(22) Filed: Apr. 28, 2005

(65) Prior Publication Data
US 2006/0224580 A1    Oct. 5, 2006

Related U.S. Application Data

(63) Continuation-in-part of application No. 11/096,118, filed on Mar. 31, 2005.

(51) Int. Cl.
*G06F 17/30* (2006.01)

(52) U.S. Cl. .............. 707/3; 707/1; 707/2; 707/4; 707/5

(58) Field of Classification Search ............ 707/1, 707/2, 3, 4, 5
See application file for complete search history.

(56) References Cited

U.S. PATENT DOCUMENTS

| | | | | |
|---|---|---|---|---|
| 5,963,940 A | * | 10/1999 | Liddy et al. ............... | 707/5 |
| 2002/0198875 A1 | * | 12/2002 | Masters .................. | 707/4 |
| 2003/0069877 A1 | * | 4/2003 | Grefenstette et al. ......... | 707/2 |

OTHER PUBLICATIONS

Strzalkowski, Tomek et al., Natural Language Information Retrieval In Digital Libraries, 1996, ACM, p. 117-125.*
Mason McDaniel and M. Hossain Heydari, Content Based File Type Detection Algorithms, Proceedings of the 36th Hawaii International Conference on System Sciences (HICSS '03), (10 pages).

* cited by examiner

*Primary Examiner*—Hosain T Alam
*Assistant Examiner*—Amy Ng
(74) *Attorney, Agent, or Firm*—Robert O. Enyard, Jr.; Polsinelli Shalton Flanigan Suelthaus PC

(57) ABSTRACT

There is provided a search engine or other electronic search application that receives an inputted query in natural language. The search engine then analyzes the query in accordance with the syntactic relationships of the natural language in which it was presented, weights the syntactic relationships, and generates a result to the query as output, corresponding to the syntactic relationship of the greatest weight. The outputted result is typically an answer, in the form of a sentence or a phrase, along with the document from which the sentence or phrase is taken, including a hypertext link for the document.

27 Claims, 18 Drawing Sheets

| concept_name | start_concept | end_concept |
|---|---|---|
| a | VALID | INVALID |
| about | VALID | INVALID |
| an | VALID | INVALID |
| and | INVALID | INVALID |
| are | VALID | VALID |
| as | INVALID | INVALID |
| at | VALID | INVALID |
| be | VALID | INVALID |
| but | INVALID | INVALID |
| by | VALID | INVALID |
| do | INVALID | INVALID |
| for | VALID | VALID |
| from | VALID | VALID |
| have | VALID | VALID |
| how | VALID | INVALID |
| i | VALID | INVALID |
| if | INVALID | INVALID |
| in | INVALID | INVALID |
| is | VALID | VALID |
| it | VALID | INVALID |
| not | VALID | VALID |
| of | INVALID | VALID |
| on | INVALID | VALID |
| or | INVALID | INVALID |
| out | VALID | VALID |
| so | INVALID | INVALID |
| that | INVALID | INVALID |
| the | VALID | INVALID |
| this | VALID | INVALID |
| to | INVALID | INVALID |
| was | VALID | VALID |
| we | VALID | INVALID |
| what | VALID | INVALID |
| when | INVALID | INVALID |
| where | INVALID | INVALID |
| which | INVALID | INVALID |
| with | VALID | INVALID |
| you | VALID | INVALID |
| , | INVALID | INVALID |
| : | INVALID | INVALID |
| ; | INVALID | INVALID |
| ! | INVALID | INVALID |
| ? | INVALID | INVALID |
| @ | INVALID | INVALID |
| * | INVALID | INVALID |

FIG.8

| what | is.v | Ss*w |
| is.v | level.n | Ost |
| the | level.n | Ds |
| current.n | level.n | AN |
| security.n | level.n | AN |

| what.nil | is.v | Ss*w | CLID8 |
| is.v | level.n | Ost | CLID9 |
| the.nil | level.n | Ds | CLID1 |
| current.n | level.n | AN | CLID2 |
| security.n | level.n | AN | CLID3 |

AUTHORITY TABLE

| AUTHOR 82 | | PUBLISHING SOURCE 83 | | PUBLISHING CLASS 84 | |
|---|---|---|---|---|---|
| STEPHEN A. SMITH : | 65 | ENCB : | 95 | ENC : | 95 |
| THOMAS FRIEDMAN : | 35 | EMCW : | 95 | KNS : | 80 |
| GEORGE WILL : | 35 | WP : | 50 | BLOG : | 30 |
| MR. X : | 10 | NYT : | 45 | DEF : | 0 |
| MISS Y : | 5 | SI : | 40 | | |
| DEF : | 0 | CNN : | 35 | | |
| | | FOX : | 15 | | |
| | | BLOGX : | 5 | | |
| | | BLOGY : | 3 | | |
| | | DEF : | 0 | | |

FIG.13

LINK (RELATIONAL CONNECTOR) WEIGHT TABLES

TABLE 14-1: NON-MAJOR LINK TYPE WEIGHTS

| LINK TYPE | LINK WEIGHT |
|---|---|
| Ss*w | .2 |

TABLE 14-2: MAJOR LINK TYPE WEIGHTS

| LINK TYPE | LINK WEIGHT | LINK TYPE | LINK WEIGHT | LINK TYPE | LINK WEIGHT |
|---|---|---|---|---|---|
| A | 1.00 | GN | 0.95 | PF | 0.20 |
| AA | 0.55 | H | 0.25 | PP | 0.75 |
| AF | 0.20 | I | 0.75 | Q | 0.20 |
| AL | 0.35 | ID | 0.50 | QI | 0.50 |
| AM | 0.10 | IN | 0.80 | R | 0.50 |
| AN | 1.00 | J | 0.45 | RS | 0.45 |
| AZ | 0.25 | JG | 0.90 | RW | 0.00 |
| B | 0.45 | JQ | 0.20 | S | 1.00 |
| BI | 0.80 | JT | 0.50 | SF | 0.20 |
| BT | 0.20 | K | 0.50 | SFI | 0.20 |
| BW | 0.25 | L | 0.75 | SI | 0.45 |
| C | 0.40 | LE | 0.25 | SX | 0.50 |
| CC | 0.30 | LI | 0.75 | SXI | 0.45 |
| CO | 0.45 | M | 0.75 | TA | 0.80 |
| CP | 0.00 | MF | 0.25 | TD | 0.80 |
| CQ | 0.25 | MG | 0.80 | TH | 0.45 |
| CX | 0.20 | MV | 0.75 | TI | 0.80 |
| D | 0.95 | MX | 0.70 | TM | 0.95 |
| DD | 0.80 | N | 0.90 | TO | 0.70 |
| DG | 0.82 | ND | 0.84 | TQ | 0.30 |
| DP | 0.45 | NF | 0.80 | TS | 0.55 |
| DT | 0.80 | NI | 0.80 | TW | 0.95 |
| E | 0.75 | NJ | 0.55 | TY | 0.90 |
| EA | 0.80 | NN | 0.95 | U | 0.75 |
| EB | 0.50 | NO | 0.45 | UN | 0.50 |
| EC | 0.70 | NR | 0.60 | V | 0.75 |
| EE | 0.80 | NS | 0.80 | W | 0.00 |
| EF | 0.45 | NT | 0.60 | WN | 0.30 |
| EI | 0.50 | NW | 0.80 | WR | 0.25 |
| EL | 0.40 | O | 1.00 | X | 0.05 |
| EN | 0.55 | OD | 0.75 | Y | 0.50 |
| ER | 0.45 | OF | 0.70 | PS | 0.70 |
| EZ | 0.20 | ON | 0.75 | YS | 0.70 |
| FL | 0.30 | OT | 0.50 | Z | 0.25 |
| FM | 0.55 | OX | 0.27 | | |
| G | 1.00 | P | 0.80 | | |

FIG.14

NATURAL LANGUAGE BASED SEARCH ENGINE AND METHODS OF USE THEREFOR

CROSS-REFERENCES TO RELATED APPLICATIONS

This application is a continuation in part application of commonly owned U.S. patent application Ser. No. 11/096,118, entitled: NATURAL LANGUAGE BASED SEARCH ENGINE AND METHODS OF USE THEREFOR, filed Mar. 31, 2005, the disclosure of which is incorporated by reference in its entirety herein.

TECHNICAL FIELD

The present invention is directed to systems and methods for analyzing queries, placed into the system in natural language, and typically generating at least one result for the natural language query. The result is typically an answer, in the form of a sentence or a phrase, and the document from which it is taken, including a hypertext link for the document.

BACKGROUND

As technology progresses, considerable amounts of information are becoming digitized, so as to be accessible through databases, servers and other storage media, along networks, including the Internet. When a user seeks certain information, it is essential to provide the most relevant information in the shortest time. As a result, search engines have been developed, to provide users with such relevant information.

Search engines are programs that search documents for specified keywords, and return a list of the documents where the keywords were found. The search engines may find these documents on public networks, such as the World Wide Web (WWW), newsgroups, and the like.

Contemporary search engines operate by indexing keywords in documents. These documents include, for example, web pages, and other electronic documents. Keywords are words or groups of words, that are used to identify data or data objects. Users typically enter words, phrases or the like, typically with Boolean connectors, as queries, on an interface, such as a Graphical User Interface (GUI), associated with a particular search engine. The search engine isolates certain words in the queries, and searches for occurrences of those keywords in its indexed set of documents. The search engine then returns one or more listings to the GUI. These listings typically include a hypertext link to a targeted web site, that if clicked by the user, will direct the browser associated with the user to the targeted web site.

Other contemporary search engines have moved away from keyword searching, by allowing a user to enter a query in natural language. Natural language, as used here and throughout this document (as indicated below), includes groups of words that humans use in their ordinary and customary course of communication, such as in normal everyday communication (general purpose communication) with other humans, and, for example, may involve writing groups of words in an order as though the writer was addressing another person (human). These systems that use natural language are either template based systems or knowledge based systems. These systems can operate together or independently of each other.

Template based systems employ a variety of question templates, each of which is responsible for handling a particular type of query. For example, templates may be instruction templates (How do I "QQ"?), price templates (How much does "RR" cost), direction templates (Where is "SS" located?), historical templates (When did "TT" occur), contemporary templates (What is the population of "UU"?, Who is the leader of "VV"?), and other templates, such as (What is the market cap of "WW"?, What is the stock price of "XX"?). These templates take the natural language entered and couple it with keywords, here for example, "QQ"-"XX" and may further add keywords, in order to produce a refined search for providing a response to the query.

Knowledge based systems are similar to template based systems, and utilize knowledge that has been previously captured to improve on searches that would utilize keywords in the query. For example, a search using the keyword "cats" might be expanded by adding the word "feline" from the knowledge base that cats are felines. In another example, the keyword "veterinarians" and the phrase "animal doctor" may be synomonous in accordance with the knowledge base.

However, both the template and knowledge based systems, although using some natural language, continue to conduct keyword based searches. This is because they continue to extract keywords from the natural language queries entered, and search based on these keywords. While the searches conducted are more refined than pure keyword based search engines, these systems do not utilize the natural language as it is written, and in summary, perform merely refined keyword searches. The results of such searches are inaccurate and have little if any chance of returning a precise answer for the query.

SUMMARY

This document references terms that are used consistently or interchangeably herein. These terms, including variations thereof, are as follows.

"Natural language", as stated above, includes groups of words that humans use in their ordinary and customary course of communication, such as in normal everyday communication (general purpose communication) with other humans, and, for example, may involve writing groups of words in an order as though the writer was addressing another person (human).

"Query" includes a request for information, for example, in the form of one or more, sentences, phrases, questions, and combinations thereof.

"Pull", "pulls", "pulled", "pulling", and variations thereof, include the request for data from another program, computer, server, or other computer-type device, to be brought to the requesting module, component, device, etc., or the module, component, device, etc., designated by the requesting device, module, etc.

"Documents" are any structured digitized information, including textual material or text, and existing as a single sentence or portion thereof, for example, a phrase, on a single page, to multiple sentences or portions thereof, on one or more pages, that may also include images, graphs, or other non-textual material.

"Sentences" include formal sentences having subject and verbs, as well as fragments, phrases and combinations of one or more words.

"Word" includes a known dictionary defined word, a slang word, words in contemporary usage, portions of words, such as "'s" for plurals, groups of letters, marks, such as "?", ", ", symbols, such as "@", and characters.

For purposes of explanation, concepts are used interchangeably with concept identifiers (CIDs), and concept links are used interchangeably with concept link identifiers (CLIDs).

"Modules", are typically self contained components, that facilitate hardware, software, or combinations of both, for performing various processes, as detailed herein.

"Push", "pushes", "pushed", "pushing" or variations thereof, include data sent from one module, component, device, etc, to another module, component, device, etc., without a request being made from any of the modules, components, devices, etc., associated with the transfer of the data.

"Statement", is a set of concept links (concept link identifiers) that corresponds to a parse of a particular sentence (from its natural language).

A "query statement" is a set of concept links (concept link identifiers) that correspond to the parse of the query.

A "master set" is all of the valid concept link identifiers (CLIDs) from a query statement.

A "power set" is written as the function P(S), and is representative of the set of all subsets of "S", where "S" is the master set.

"Degree" or "degrees" is the number of concept links in a set.

A "blog" is short for "Web Log", and is a publicly accessible personal journal, typically of an individual.

The present invention improves on the contemporary art, as it provides a search engine and associated functionalities, that operate on natural language queries, and utilize the syntactic relationships between the natural language elements of the query, to typically return at least one result to the user.

The system of the invention is also a cumulative system, that continuously builds its data store, from which query answers are obtained. As time progresses, the data store becomes increasingly larger, increasing the chances for a more precise answer to queries entered by users.

The system of the invention is suitable for private networks, such as with enterprises, as well as public networks, such as wide area networks, for example, the Internet. The invention is also operable with combinations of private and public networks.

An embodiment of the invention is directed to a method for providing data. The method includes, creating related pairs of words from at least one document in a corpus, assigning a concept identifier to each word of each related pair of words, creating pairs of concept identifiers by applying the assigned concept identifiers to each word in each related pair of words, assigning concept link identifiers to each pair of concept identifiers, and, calculating a value for each concept link identifier.

Another embodiment of the invention is directed to a method for providing at least one response to at least one query in natural language. The method includes, populating a data store by obtaining documents from at least a portion of a corpus, isolating sentences from the documents, parsing the sentences into linked pairs of words in accordance with predetermined relationships, assigning concept identifiers to each word of the linked pair of words, assigning concept link identifiers to each pair of concept identifiers corresponding to each word of each linked pair of words, and, combining the concept link identifiers for each sentence into a statement.

The method also includes, receiving an inputted query in natural language, parsing the query into linked pairs of words in accordance with predetermined relationships, assigning concept identifiers to each word of the linked pair of words, assigning concept link identifiers to each pair of concept identifiers corresponding to each linked pair of words, determining values for each of the concept link identifiers, and, combining the concept link identifiers into a query statement.

The query statement and the statements in the data store are analyzed for matches of concept link identifiers. Matches occur when a statement in the data store has at least one concept link identifier that matches at least one concept link identifier in the query statement. Matching statements from the data store are isolated. The weight of each of the isolated statements from the data store is calculated, and at least one response to the query is provided. The at least one response includes at least one sentence corresponding to the isolated statement from the data store having the greatest weight.

Another embodiment of the invention is directed to a method for providing at least one response to a query. The method includes, obtaining at least one document from at least a portion of a corpus, isolating sentences from the at least one document, creating pairs of words from each of the sentences, each pair of words corresponding to a concept link identifier, and, creating a statement from at least one concept link identifier from each sentence.

The method also includes receiving at least one query, creating a query statement by creating pairs of words from the words that form the at least one query, each pair of words corresponding to a concept link identifier, and the query statement including at least one concept link identifier.

Statements having at least one concept link identifier matching at least one concept link identifier of the query statement are then isolated, and weights for each of the isolated statements are calculated. At least one sentence corresponding to the statement of the greatest weight is provided as the at least one response to the at least one query.

Another embodiment of the invention is directed to an architecture for providing at least one response to a query. The architecture includes a first module, and a second module. The first module is configured for, obtaining at least one document from at least a portion of a corpus, isolating sentences from the at least one document, creating pairs of words from each of the sentences, each pair of words corresponding to a concept link identifier, and, creating a statement from at least one concept link identifier from each sentence. The second module is configured for, receiving at least one query, creating a query statement by creating pairs of words from the words that form the at least one query, each pair of words corresponding to a concept link identifier, and, the query statement including at least one concept link identifier. The second module is also configured for, isolating statements having at least one concept link identifier matching at least one concept link identifier of the query statement, calculating weights for each of the isolated statements, and, providing at least one sentence corresponding to the statement of the greatest weight as the at least one response to the at least one query.

Another embodiment of the invention is directed to a method for analyzing a query. The method includes, receiving a query in natural language, obtaining at least one response to the query, the at least one response in accordance with the relationships of the words to each other in natural language of the query, and, selecting at least one response to the query having the greatest weight. The weight of the at least one response is a function of the authority of the document from which the response was derived and the time relevance of the relationships of the words to each other in the response.

Another embodiment of the invention is directed to a search engine. The search engine includes, a first component and a second component. The first component is configured for receiving a query in natural language. The second component is configured for providing at least one response to the query, the at least one response in accordance with the relationships of the words to each other in natural language of the query, and, having the greatest weight. The weight of the at least one response is a function of the authority of the document from which the at least one response was derived and the time relevance of the relationships of the words to each other in the at least one response.

Another embodiment of the invention is directed to a method of providing responses to a query. The method includes obtaining statements, each statement derived from at least one sentence of at least one document, the at least one document defining at least a portion of a corpus, each of the isolated statements formed from the relationships of the words within the at least one sentence, isolating at least one of the obtained statements, and, calculating a weight for the at least one isolated statement.

Another embodiment of the invention is directed to an architecture for providing responses to a query. The architecture includes first, second, and third components. The first component is configured for obtaining statements, each statement derived from at least one sentence of at least one document, the at least one document defining at least a portion of a corpus, and each of the isolated statements is formed from the relationships of the words within the at least one sentence. The second component is configured for isolating at least one of the obtained statements. The third component is configured for calculating a weight for the at least one isolated statement.

Another embodiment of the invention is directed to a programmable storage device readable by a machine, tangibly embodying a program of instructions executable by a machine to perform method steps for providing responses to a query. The method steps are selectively executed during the time when the program of instructions is executed on the machine, and these method steps include, obtaining statements, each statement derived from at least one sentence of at least one document, the at least one document defining at least a portion of a corpus, each of the isolated statements formed from the relationships of the words within the at least one sentence, isolating at least one of the obtained statements, and, calculating a weight for the at least one isolated statement.

Another embodiment of the invention is directed to a programmable storage device readable by a machine, tangibly embodying a program of instructions executable by a machine to perform method steps for providing responses to a query. The method steps are selectively executed during the time when the program of instructions is executed on the machine, and these method steps include, receiving a query in natural language, obtaining at least one response to the query, the at least one response in accordance with the relationships of the words to each other in natural language of the query, and, selecting at least one response to the query having the greatest weight. The weight of the at least one response is a function of the authority of the document from which the response was derived and the time relevance of the relationships of the words to each other in the response.

BRIEF DESCRIPTION OF THE DRAWINGS

Attention is now directed to the drawing figures, where corresponding or like numerals and/or characters, indicate corresponding or like components. In the drawings:

FIG. 8 is a table of stop words;

FIG. 13 is a table of authority values;

FIG. 14 is a Link Weight Table for relational connectors associated with each Concept Link Identifier (CLID);

Appendices A-D are also attached to this document.

DETAILED DESCRIPTION

The invention is directed to systems and methods for performing search engine functions and applications. In particular, the invention is directed to search engines that perform searches based on the natural language and its associated syntax of the query, that has been entered into the system, and for which a search result will be produced. Throughout this document (as indicated above), "query" includes a request for information, for example, in the form of one or more, sentences, phrases, questions, and combinations thereof.

Figure 1A:
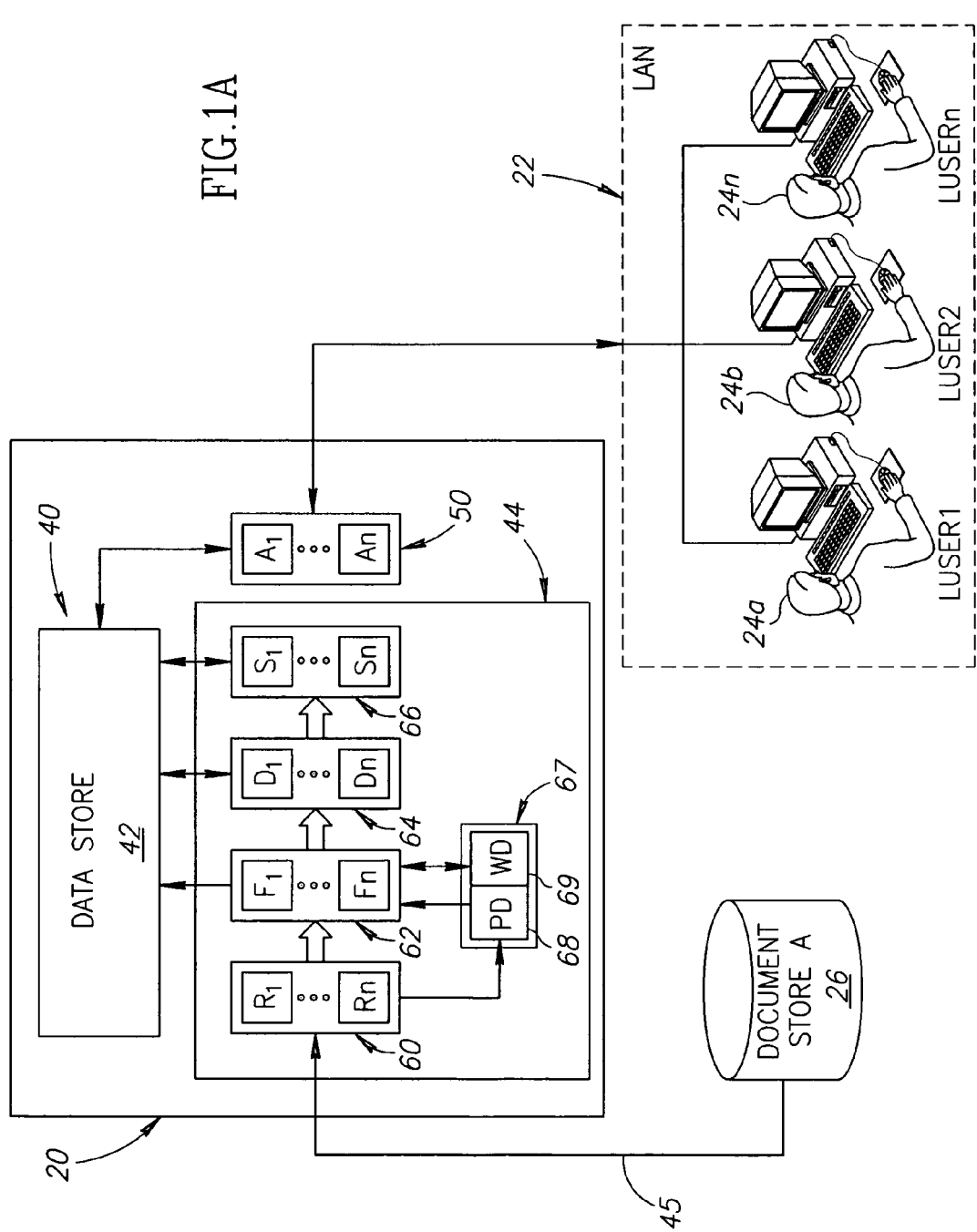
FIG. 1A is a schematic diagram of the system of an embodiment of the invention in an exemplary operation in an enterprise or private network, such as a local area network (LAN)
Figure 1B:
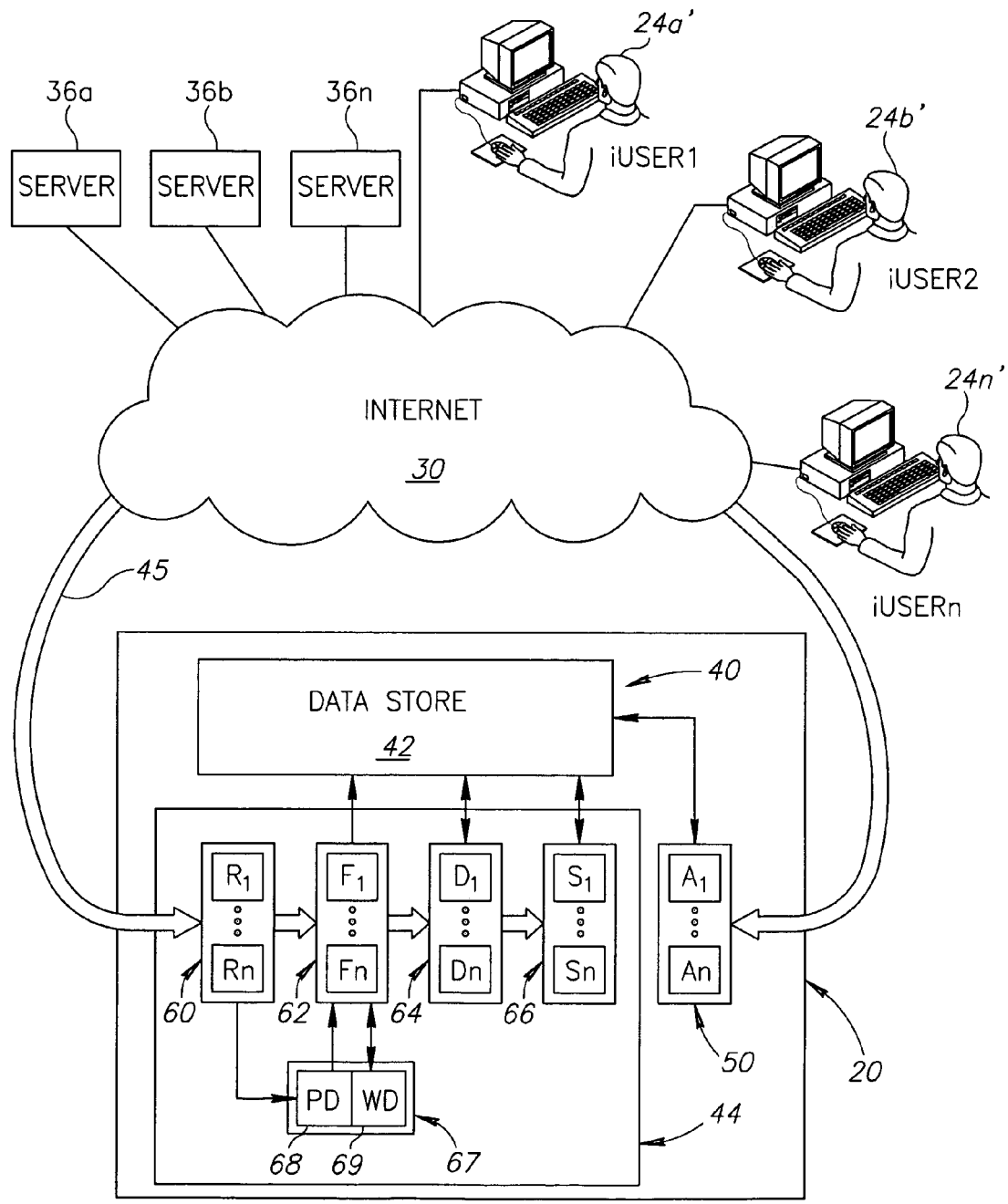
FIG. 1B is a schematic diagram of the system of an embodiment of the invention in an exemplary operation in a public network, such as the Internet.

FIGS. 1A and 1B detail the system of the invention, in an exemplary configuration as a server 20 or other hosting system of one or more components, in exemplary operations. The server 20 is common to the systems of FIG. 1A and FIG. 1B, except where specifically modified to accommodate the private or local area network (LAN) of FIG. 1A, and the public or wide area network (WAN) of FIG. 1B. Alternately, the server 20 can be modified to work with networks that are partially private and partially public.

FIG. 1A shows the server 20 operating in a closed system (private network), such as a local area network (LAN) 22, being accessed by users 24a, 24b, 24n (LUSER1-LUSERn). The server 20 receives data from document storage media, for example, the document store 26. This setting is typical of an enterprise setting.

FIG. 1B shows the server 20 operating in a publicly accessible network, for example, with a wide area network (WAN), such as the Internet 30. The server is accessed by one or more users 24a', 24b', 24n' (iUSER1-iUSERn), and the server 20 is linked to the Internet 30 to obtain feeds from sources linked to the Internet 30, for example, such as target Hypertext Transfer Protocol (HTTP) or File Transfer Protocol (FTP) servers 36a-36n. As used in this document "link(s)", "linked" and variations thereof, refer to direct or indirect electronic connections that are wired, wireless, or combinations thereof.

The server 20 is the same in FIGS. 1A and 1B, except for the links to the sources and network connections. The server 20 is formed of an exemplary architecture 40 for facilitating embodiments of the invention. The architecture 40 is typically on a single server, but is also suitable to be on multiple servers and other related apparatus, with components of the architecture also suitable for combination with additional devices and the like.

The server 20 is typically a remote computer system that is accessible over a communications network, such as the Internet, a local area network (LAN), or the like. The server serves as an information provider for the communications network.

Figure 2:
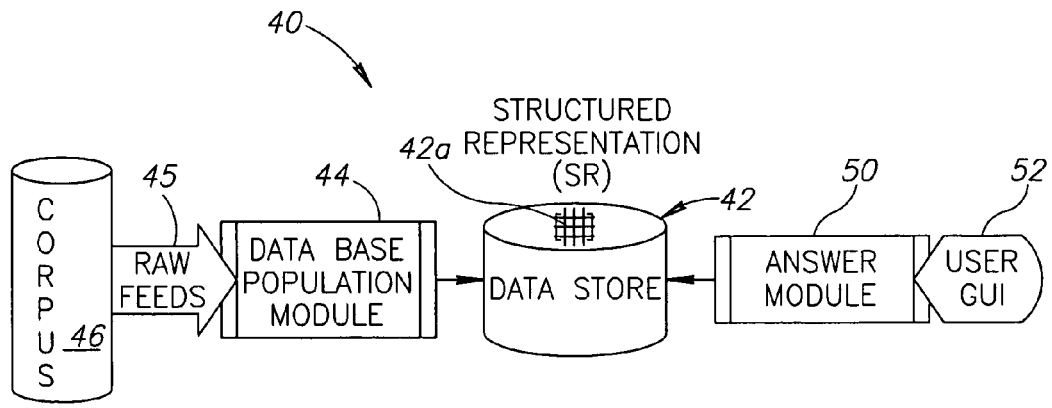
FIG. 2 is a schematic diagram of the architecture for the system of FIGS. 1A and 1B.

Turning also to FIG. 2, the architecture 40 may be, for example, an application, such as a search engine functionality. The architecture 40 includes a data store 42, that typically includes one or more databases or similar data storage units. A database population module 44 populates (provides) the data store 42 with content, by pulling data from raw feeds 45 (FIG. 2), and processing the pulled data. The database population module 44 receives raw feeds 45, by pulling them from a corpus 46 or a portion of the corpus 46.

Throughout this document (as indicated above), the terms "pull", "pulls", "pulled", "pulling", and variations thereof, include the request for data from another program, computer, server, or other computer-type device, to be brought to the requesting module, component, device, etc., or the module, component, device, etc., designated by the requesting device, module, etc.

The corpus 46 is a finite set of data at any given time. For example, the corpus 46, may be text in its format, and its content may be all of the documents of an enterprise in electronic form, a set of digitally encoded content, data from one or more servers, accessible over networks, such as the Internet, etc. Raw feeds 45 may include, for example, news articles, web pages, blogs, and other digitized and electronic data, typically in the form of documents.

Throughout this document (as indicated above), "documents" are any structured digitized information, including textual material or text, existing as a single sentence or portion thereof, for example, a phrase, on a single page, to multiple sentences or portions thereof, on one or more pages, that may also include images, graphs, or other non-textual material. "Sentences" include formal sentences having subject and verbs, as well as fragments, phrases and combinations of one or more words. Also, a "word" includes a known dictionary defined word, a slang word, words in contemporary usage, portions of words, such as "'s" for plurals, groups of letters, marks, such as "?", ", ", symbols, such as "@", and characters.

The pulled data is processed by the database population module 44, to create a structured representation (SR) 42a, that is implemented by the data store 42. The structured representation (SR) 42a includes normalized documents (an internally processed document into a format usable by the document module (D) 64, as detailed below), the constituent sentences from each normalized document, and collections of syntactic relationships derived from these sentences. Syntactic relationships include, for example, syntactic relationships between words. The words originate in documents, that are broken into constituent sentences, and further broken into data elements including concepts, concept links (groups of concepts, typically ordered pairs of concepts), and statements (groups of concept links).

As detailed below, concepts and concept links will be assigned identifiers. In particular, each concept is assigned a concept identifier (CID), and each concept link, formed by linked pairs of concept identifiers (CIDs), in accordance with the relational connectors of the Link Grammar Parser (LGP), as detailed below, is assigned a concept link identifier (CLID). Accordingly (as indicated above), for purposes of explanation, concepts are used interchangeably with concept identifiers (CIDs), and concept links are used interchangeably with concept link identifiers (CLIDs).

An answer module (A) 50 is also linked to a graphical user interface (GUI) 52 to receive input from a user. The answer module (A) 50 is also linked to the structured representation (SR) 42a, as supported by the data store 42.

Turning back to FIGS. 1A and 1B, the database population module 44 includes retrieval modules ($R_1$-$R_n$) 60, feed modules ($F_1$-$F_n$) 62, that are linked to document modules ($D_1$-$D_n$) 64, that are linked to sentence modules ($S_1$-$S_n$) 66. The retrieval modules ($R_1$-$R_n$) 60 are linked to storage media 67, that is also linked to the feed modules ($F_1$-$F_n$) 62. The feed modules ($F_1$-$F_n$) 62, document modules ($D_1$-$D_n$) 64 and sentence modules ($S_1$-$S_n$) 66 are linked to the data store 42. "Modules", as used throughout this document (as indicated above), are typically self contained components, that facilitate hardware, software, or combinations of both, for performing various processes, as detailed herein.

The storage media 67 may be any known storage for data, digital media and the like, and may include Redundant Array of Independent Disks (RAIDs), local hard disc(s), and sources for storing magnetic, electrical, optical signals and the like. The storage media 67 is typically divided into a processing directory (PD) 68 and a working directory (WD) 69.

Figure 3:
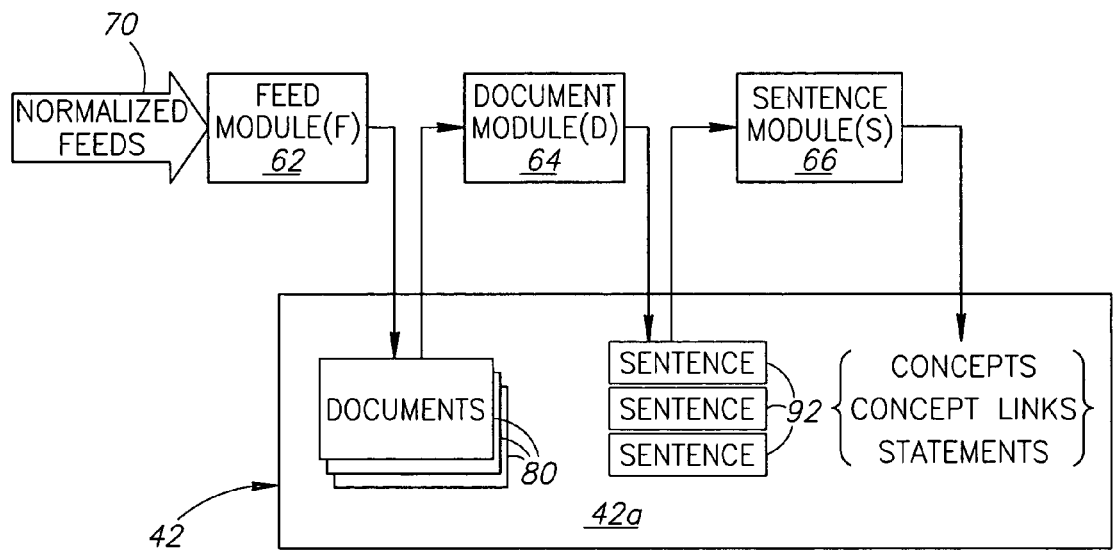
FIG. 3 is a schematic diagram of the architecture detailing the operation of the database population module.

The retrieval module ($R_1$-Rn) 60 typically receives data from external sources, for example, document stores, such as the store 26 (FIG. 1A), from the Internet 30 (FIGS. 1A and 1B), etc., in the form of raw feeds 45. The retrieval module ($R_1$-$R_n$) 60 places or pushes the retrieved data in the processing directory (PD) 68. An individual feed module ($F_1$-$F_n$) 62 moves (pushes) data from the processing directory (PD) 68, to a unique location in the working directory (WD) 69, exclusive to the particular feed module ($F_1$-$F_n$) 62. Each individual feed module ($F_1$-$F_n$) pulls data from its unique location in the working directory (WD) 69, for processing, as a normalized feed 70 (FIG. 3). The unique locations in the working directory (WD) 69, corresponding to an individual feed module ($F_1$-$F_n$) 62, preserve the integrity of the data in the file and/or document.

Throughout this document (as indicated above), "push", "pushes", "pushed", "pushing" or variations thereof, includes data sent from one module, component, device, etc, to another module, component, device, etc., without a request being made from any of the modules, components, devices, etc., associated with the transfer of the data.

Raw feeds 45 are typically retrieved and stored. If the raw feed 45 exceeds a programmatic threshold in size, the raw feed 45 will be retrieved in segments, and stored in accordance with the segments, typically matching the threshold size, on the processing directory (PD) 68. The processing directory (PD) 68, is, for example, storage media, such as a local hard drive or network accessible hard drive. The raw feeds 45, typically either a single file or in segments, may also be archived on a file system, such as a hard drive or RAID system. The sources of the raw feeds 45 are typically polled over time for new raw feeds. When new raw feeds are found, they are retrieved (pulled) and typically stored on the processing directory (PD) 68.

Specifically, the feed modules ($F_1$-$F_n$) 62 are linked to the data store 42 to store processed documents pulled into the system. The feed modules ($F_1$-$F_n$) 62 parse feeds into documents and push the documents into the data store 42. The documents that are inserted (pushed) into the data store 42 are known as unprocessed documents.

The document modules ($D_1$-$D_n$) 64 are linked to the data store 42 to pull documents from the data store 42 and return extracted sentences from the documents to the data store 42. Typically, the document modules ($D_1$-$D_n$) 64 obtain an unprocessed document from the data store 42, and extract the sentences of the document. The documents are then marked as processed, and the extracted sentences are pushed into the data store 42. These sentences, pushed into the data store 42, by the document modules ($D_1$-$D_n$) 64, are known as unprocessed sentences.

The sentence modules ($S_1$-$S_n$) 66 are linked to the data store 42 to pull the unprocessed sentences from the data store 42. The unprocessed sentences are processed, and marked as processed, and pushed into the structured representation (SR) 42a of the data store 42. Processing of the unprocessed sentences results in collections of syntactic relationships being obtained, that are returned to the data store 42 to increase the structured representation (SR) 42a and/or increment indices on existing collections of syntactic relationships.

The retrieval modules ($R_1$-$R_n$) 60, feed modules ($F_1$-$F_n$) 62, document modules ($D_1$-$D_n$) 64, and sentence modules ($S_1$-$S_n$) 66 operate independently of each other. Their operation may be at different times, contemporaneous in time, or simultaneous, depending on the amount of data that is being processed. The feed modules ($F_1$-$F_n$) 62, place documents (typically by pushing) into the data store 42. One or more document modules ($D_1$-$D_n$) 64 query the data store 42 for documents. If documents are in the data store 42, each document module ($D_1$-$D_n$) 64 pulls the requisite documents.

The documents are processed, typically by being broken into sentences, and the sentences are returned (typically by being pushed) to the data store 42. One or more sentence modules ($S_1$-$S_n$) 66 query the data store 42 for sentences. If unprocessed sentences are in the data store 42, as many sentence modules ($S_1$-$S_n$) 66 as are necessary, to pull all of the sentences from the data store 42, are used. The sentence modules ($S_1$-$S_n$) 66 process the sentences into syntactic relationships, and return the processed output to the data store 42, to increase the structured representation (SR) 42a and/or increment indices on existing syntactic relationships.

The database population module 44 includes all of the functionality required to create the structured representation (SR) 42a, that is supported in the data store 42. The database population module 44 is typically linked to at least one document storage unit 26, over a LAN or the like, as shown in FIG. 1A, or a server, such as servers 36a-36n, if in a public system such as the Internet 30, as shown in FIG. 1B, in order to pull digitized content (raw feeds 45), that will be processed into the structured representation (SR) 42a.

FIG. 3 shows an operational schematic diagram of the database population side of the architecture 40. The database population sequence, that occurs in the database population module 44, forms the structured representation (SR) 42a. For example, one or more normalized feeds 70 are pulled into a feed module (F) 62. Normalized feeds are feeds that have been stored in the working directory (WD) 69. In this figure, a single feed module (F) 62, a single document module (D) 64 and a single sentence module (S) 66 are shown as representative of the respective feed modules ($F_1$-$F_n$), document modules ($D_1$-$D_1$) and sentence modules ($S_1$-$S_n$), to explain the database (data store 42) population sequence.

Prior to the feed module (F) 62 retrieving the normalized feed 70 from the working directory (WD) 69, the retrieval module 60 (FIGS. 1A and 1B), has translated the raw feeds 45 (FIGS. 1A, 1B and 2) into files in formats usable by the feed module (F) 62. The retrieval module (R) 60 saves the now-translated files typically on the processing directory (PD) 68 or other similar storage media (PD 68 is representative of multiple processing directories). For example, Extensible Markup Language (XML) is one such format that is valid for the feed module(s) (F) 62.

The feed module (F) 62, is given the location of the processing directory (PD) 68, and will move a file or document from the processing directory (PD) 68 to a unique working directory (WD) 69 (WD 69 is representative of multiple working directories) for each individual running feed module (F) 62. The feed module (F) 62 then opens the file or document, and extracts the necessary document information, in order to create normalized document type data, or normalized documents 80.

Figure 4:
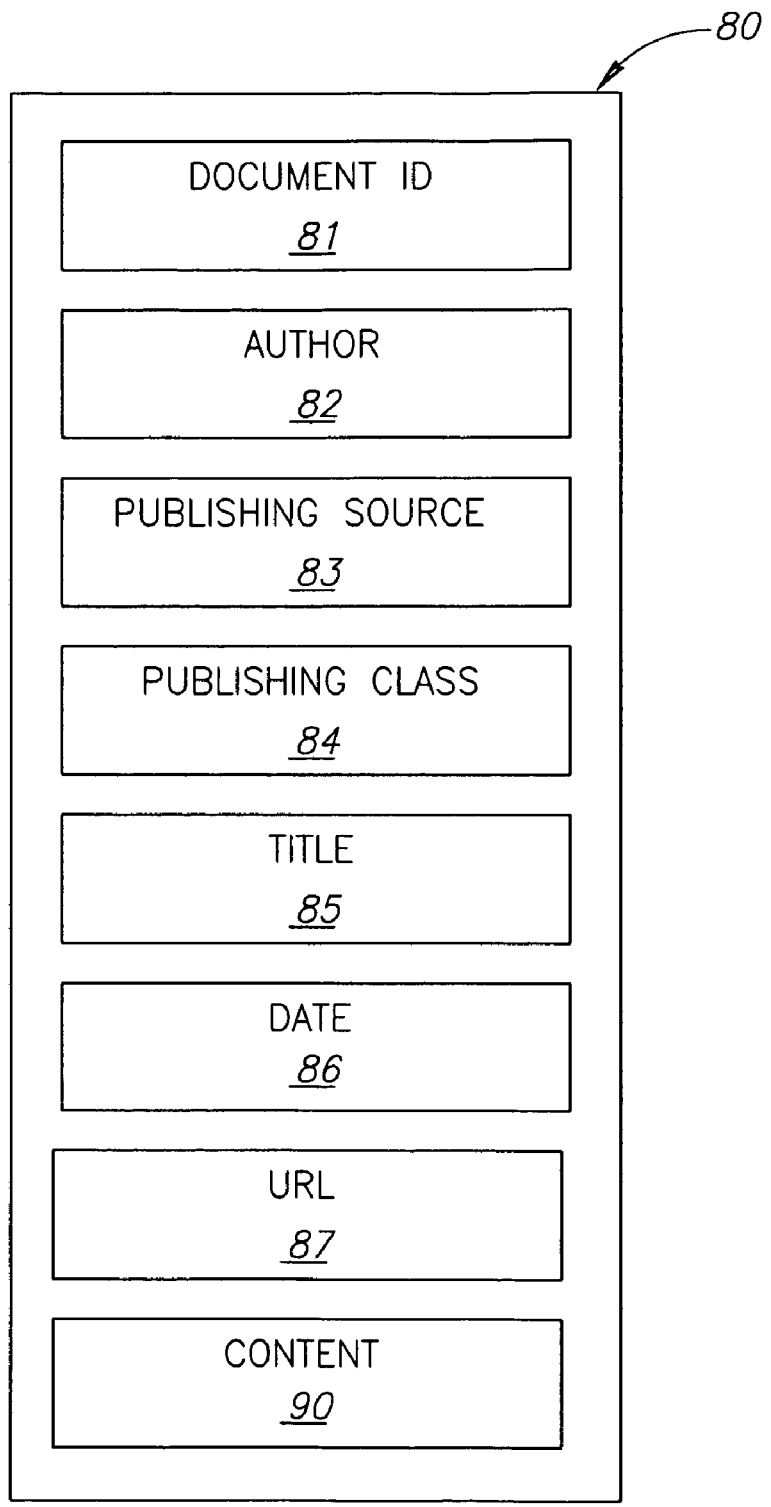
FIG. 4 is a schematic representation of a document produced in accordance with an embodiment of the invention.

FIG. 4 shows a normalized document 80 in detail, and attention is now directed to this Figure. The document 80, typically includes fields, that here, include attributes, for example, Document Identification (ID) 81, Author 82, Publishing Source 83, Publishing Class 84, Title 85, Date 86, Uniform Resource Locator (URL) 87, and content 90 (typically including text or textual material in natural language). Other fields, including additional attributes and the like are also permissible, provided they are recognized by the architecture 40.

The feed module (F) 62 isolates each field 81-87 and 90 in the document 80. Each field 81-87 and 90 is then stored in the structured representation (SR) 42a of the data store 42, as a set of relational records (records based on the Relational Database Model). The fields 81-87 and 90 represent attributes, for the document 80 that remain stored for the purpose of ranking each document against other documents. The content from the content field 90 is further processed into its constituent sentences 92 by the document module (D) 64.

The document module (D) 64, splits the content of the content field 90 into valid input for the sentence module (S) 66, or other subsequent processing modules. For example, valid input includes constituent sentences 92 that form the content field 90. The content is split into sentences by applying, for example, Lingua::EN::Sentence, a publicly available PERL Module, attached hereto as Appendix A, and publicly available over the World Wide Web at www.cpan.org. To verify that only valid sentences have been isolated, the sentences are subjected to a byte frequency analysis. An exemplary byte frequency is detailed in M. McDaniel, et al., Content Based File Type Detection Algorithms, in Proceedings of the 36th Hawaii International Conference on System Sciences, IEEE 2002, this document incorporated by reference herein.

Figure 5A:
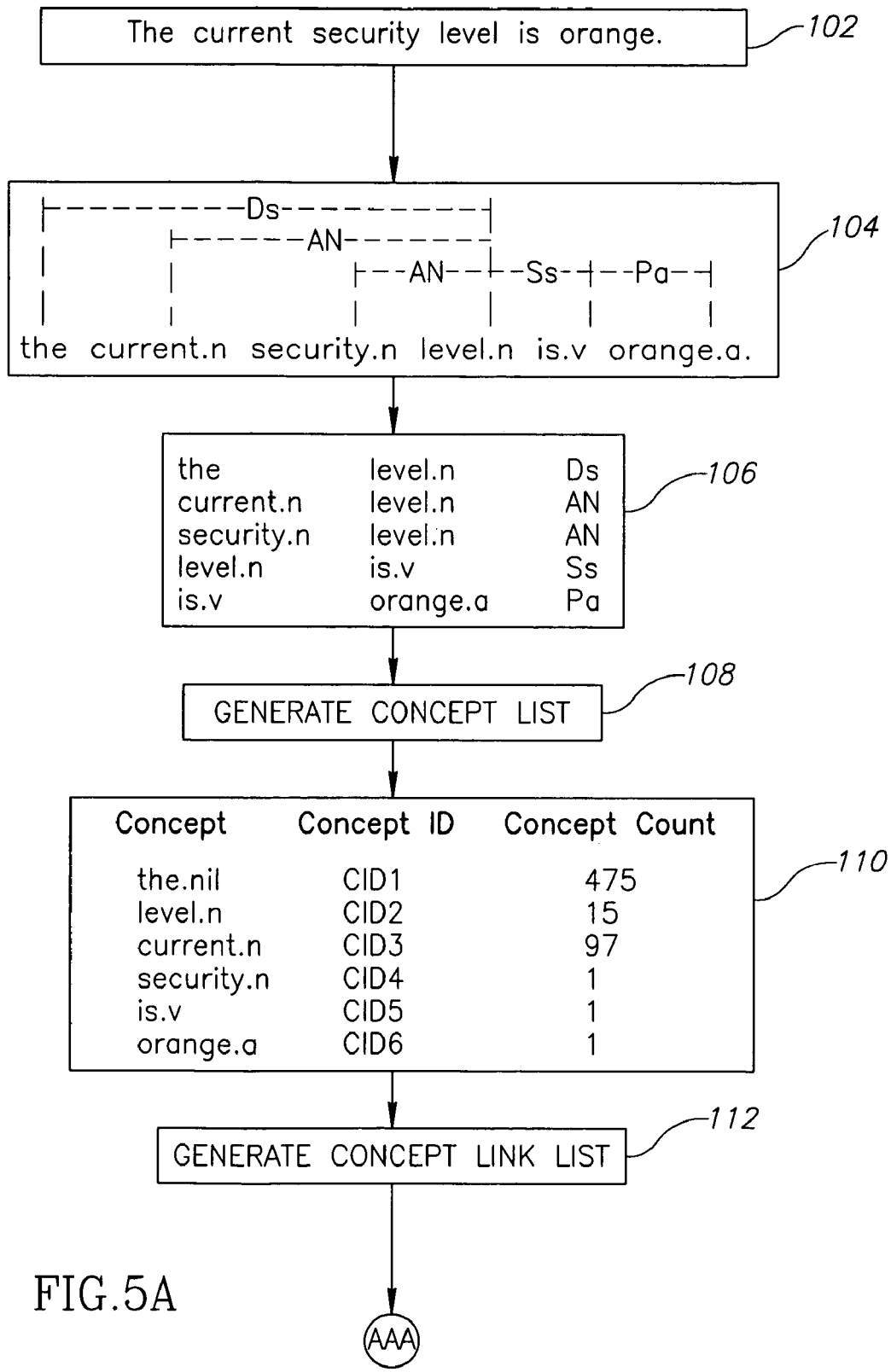
FIGS. 5A and 5B are a flow diagram of a process performed by the sentence module in accordance with an embodiment of the invention.
Figure 5B:
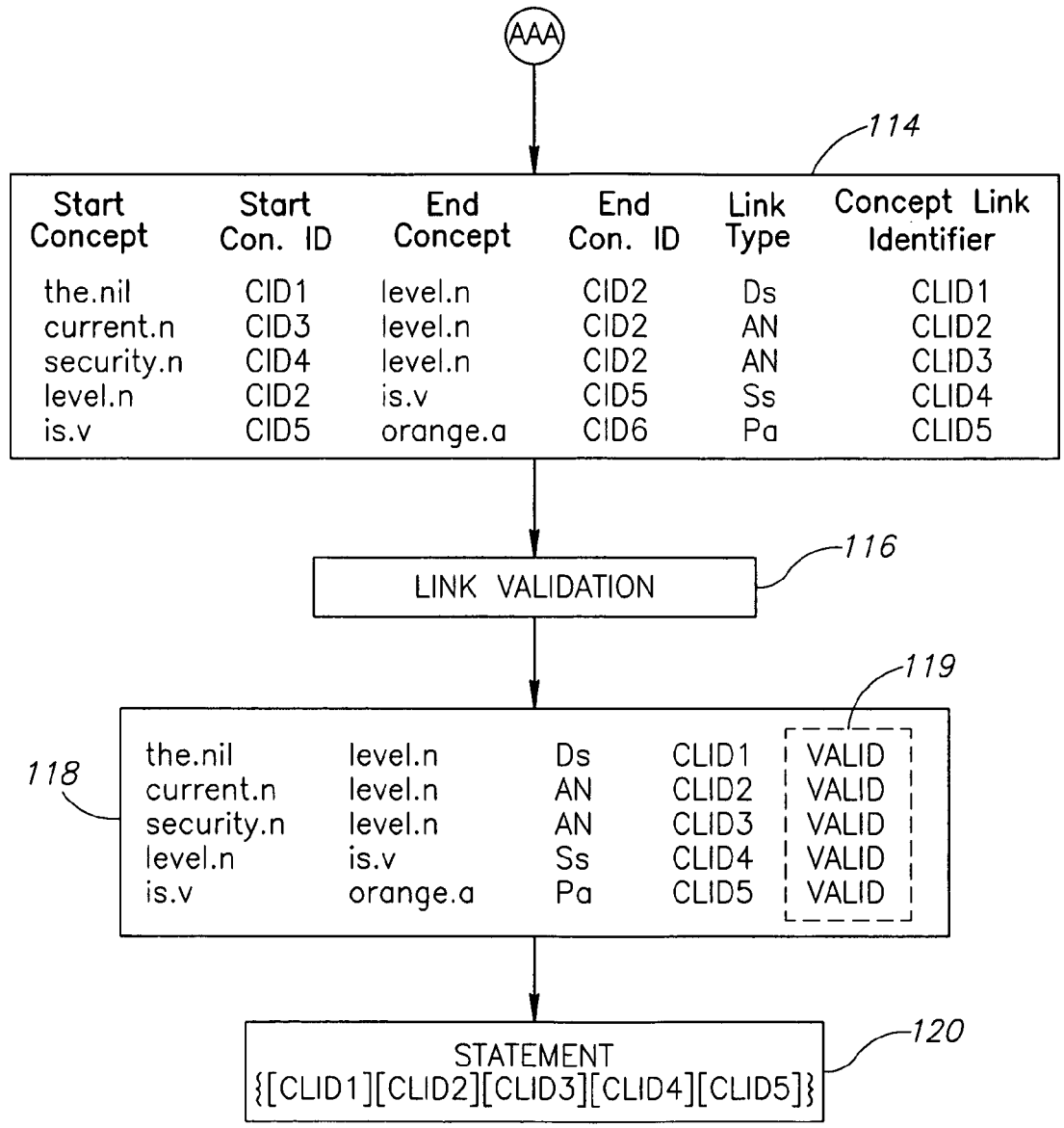

Turning also to FIGS. 5A-8, and specifically to FIGS. 5A and 5B (an exemplary operation of the sentence module (S) 66), the sentence module (S) 66 parses the sentence 92 into its grammatical components. These grammatical components may be defined as the constituent words of the sentence, their parts of speech, and their grammatical relationship to other words in the same sentence, or in some cases their relationships to words in other sentences, for example, pronouns.

The parsing is performed, for example, by the Link Grammar Parser (LGP or LGP parser), Version 4.1b, available from Carnegie Mellon University, Pittsburgh, Pa., and detailed in the document entitled: An Introduction to the Link Grammar Parser, attached as Appendix B, hereto, and in the document entitled: The Link Parser Application Program Interface (API), attached as Appendix C hereto, both documents also available on the World Wide Web at http://www.link.cs.cm-u.edu/link/dict/introduction.html. The LGP parser outputs the words contained in the sentence, identifies their parts of speech (where appropriate), and the grammatical syntactic relationships between pairs of words, where the parser recognizes those relationships.

The sentence module (S) 66, includes components that utilize the parse (parsed output), and perform operations on the parsed sentences or output to create the structured representation (SR) 42*a*. The operation of the sentence module (S) 66, including the operations on the parsed sentences, results in the structured representation (SR) 42*a*, as detailed below.

The sentence module (S) 66 uses the LGP (detailed above) to parse each sentence of each normalized document 80. The output of each parse is a series of words or portions thereof, with a concept sense, as detailed in the above mentioned document entitled: An Introduction to the Link Grammar Parser (Appendix B), with the words paired by relational connectors, or link types, as assigned by the LGP. These relational connectors or link types, as well as all other relational connectors or link types, are in described in the document entitled: Summary of Link Types, attached as Appendix D hereto.

In an exemplary operation of the sentence module (S) 66, the sentence module (S) 66 receives sentences from documents, typically one after another. An exemplary sentence received in the sentence module (S) 66 may be, the sentence 102 from a document, "The current security level is orange." The sentence 102 is parsed by the LGP, with the output of the parse shown in box 104.

In box 104, the output of the parsing provides most words in the sentence with a concept sense. While "the" does not have a concept sense, "current", "security" and "level" have been assigned the concept sense "n", indicating these words are nouns. The word "is" has a concept sense "v" next to it, indicating it is a verb, while "orange" has a concept sense "a" next to it, indicating it is an adjective. These concept senses are assigned by the LGP for purposes of its parsing operation. Assignments of concept senses by the LGP also include the failure to assign concept senses.

The output of the parsing also provides relational connectors between the designated word pairs. In box 104, the relational connectors or link types are "Ds", "AN" (two occurrences), "Ss" and "Pa". The definitions of these relational connectors are provided in Appendix C, as detailed above.

The LGP parse of box 104 is then made into a table 106. The table 106 is formed by listing word pairs, as parsed in accordance with the LGP parse, each word with its concept sense (if it has a concept sense as per the LGP parse) and the LGP link type connector. The process now moves to box 108, where a concept list 110 is generated, the process of generating the concept list described by reference to the flow diagram of FIG. 6, to which attention is now directed.

Figure 6:
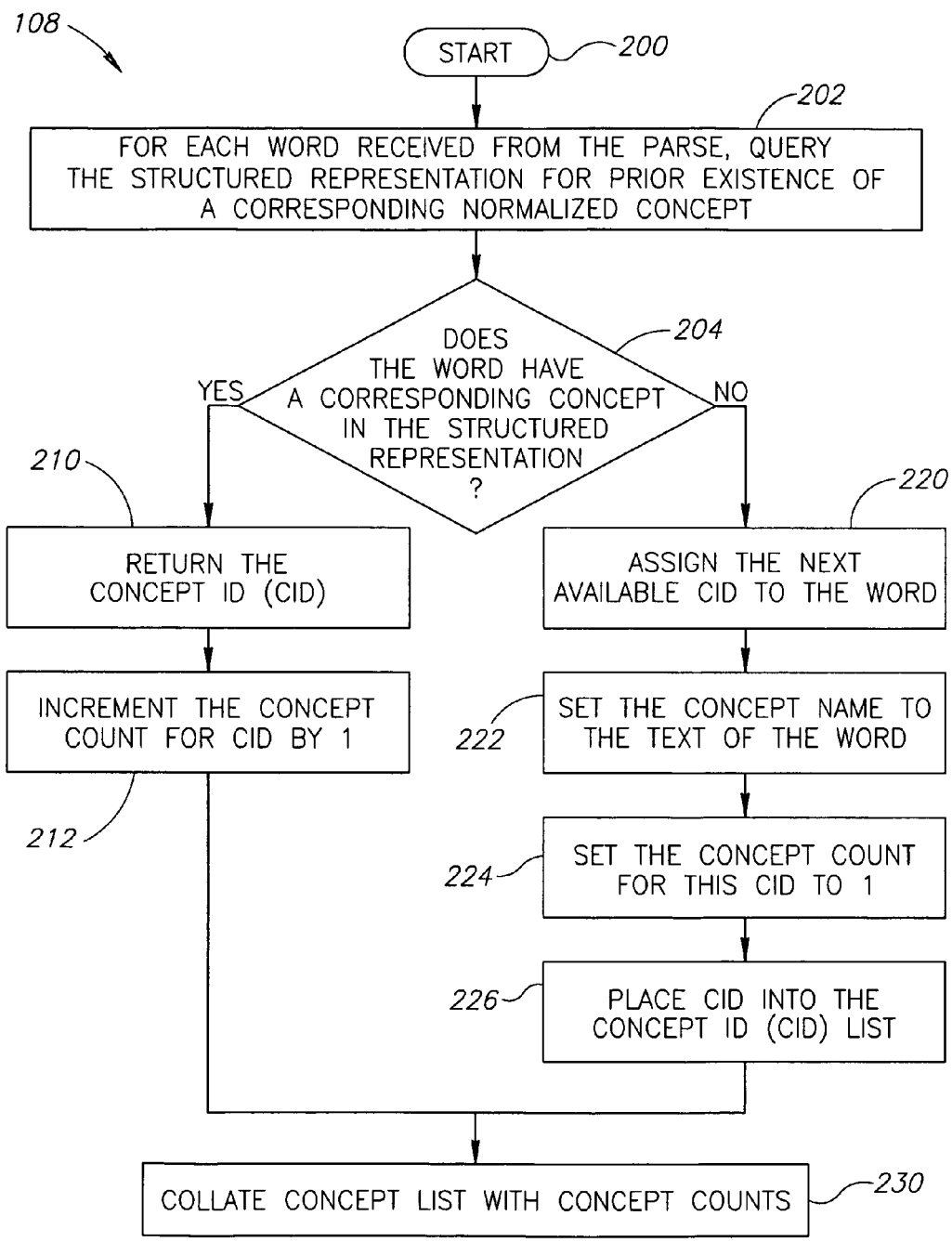
FIG. 6 is flow diagram detailing the sub process of generating a concept list in FIGS. 5A and 5B.
Figure 7A:
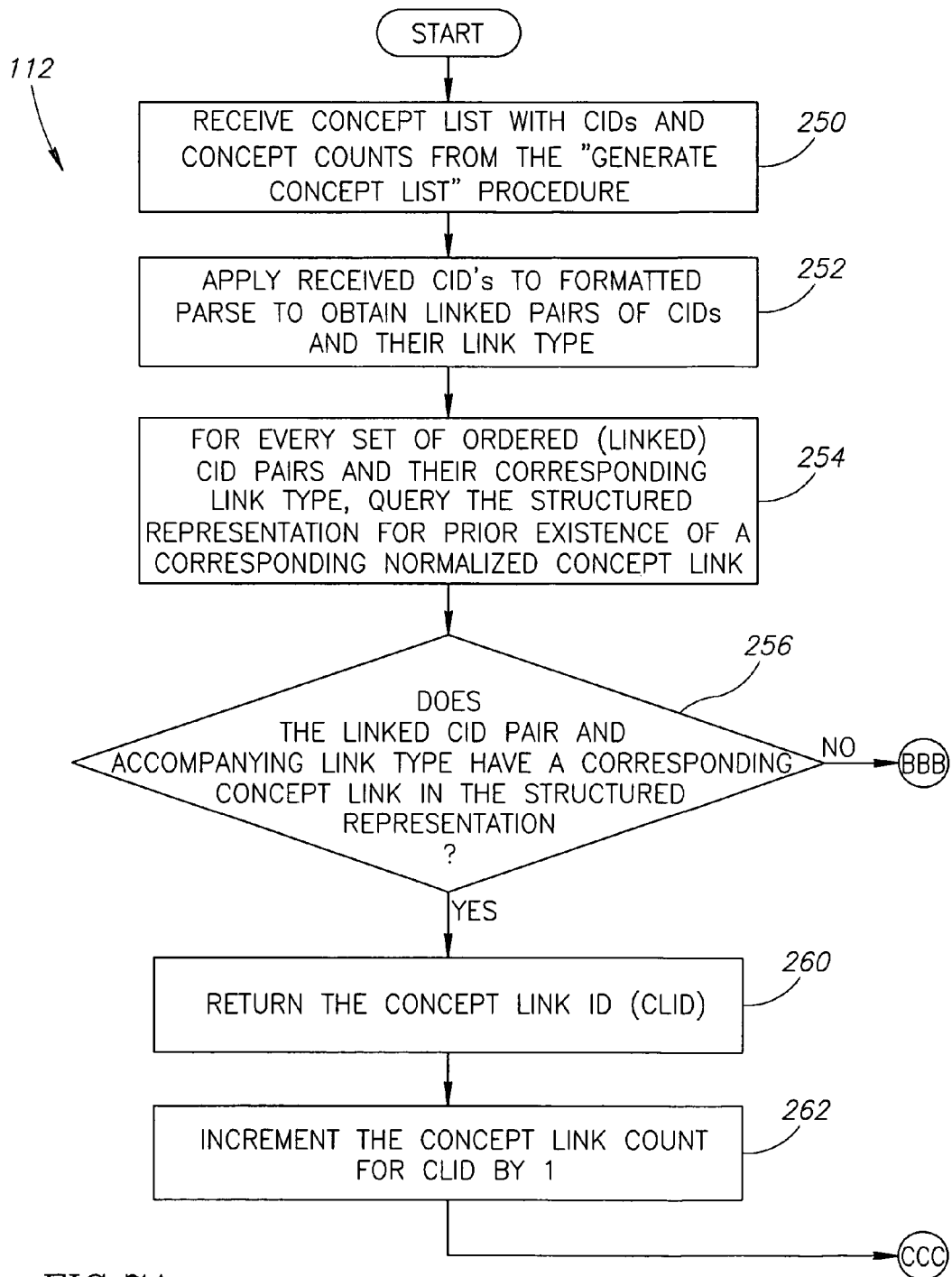
FIGS. 7A and 7B are a flow diagram detailing the sub process of generating concept links in FIGS. 5A and 5B.
Figure 7B:
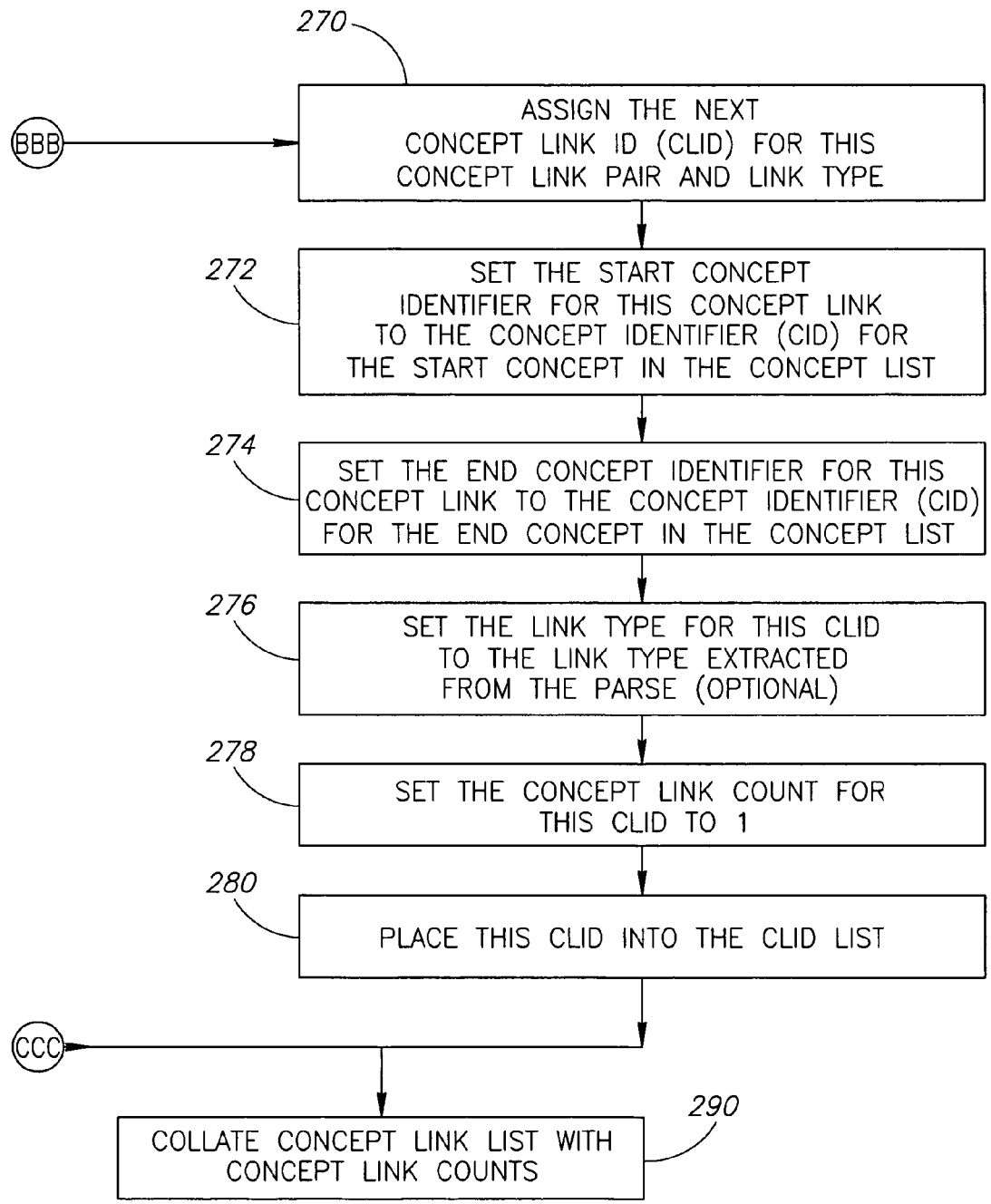

In FIG. 6, in block 200, a formatted parse from the LGP is received, and the parsed output is typically compiled into a table 106 (FIG. 5A). The compiling typically involves listing the parsed output as word pairs with their concept senses and link type connectors in an order going from left to right in the parsed output. Moving to block 202, each word from the LGP parse, typically the table of the parse, such as the table 106, is queried against the structured representation (SR) 42*a* for a prior existence of the corresponding normalized concept. At block 204, a decision is made whether or not the requisite word has a corresponding concept in the structured representation (SR) 42*a*.

If the word matches a concept in the structured representation (SR) 42*a*, the process moves to the sub process of block 210. If the word does not match any concept in the structured representation (SR) 42*a*, the process moves to the sub process of block 220.

At block 210, the word exists as a concept, as a matching word and concept sense, with a concept identifier (CID) was found in the structured representation (SR) 42*a*. Accordingly, the matching word with its concept sense is assigned the concept identifier (CID) of the matching (existing) word and its concept sense. The concept count in the database, for example, in the data store 42 or other storage media linked thereto, for this existing concept identifier (CID), is increased by 1, at block 212. The process now moves to block 230.

Turning to block 220, the word does not exist as a concept in the structured representation (SR) 42*a*. This is because a matching word and concept sense, with a concept identifier (CID), has not been found in the structured representation (SR) 42*a*. Accordingly, the next available concept identifier (CID) is assigned to this word. By assigning the word a concept identifier (CID), the word is now a concept, with the concept identifier being assigned in ascending sequential order. Also, if the LGP fails to provide a concept sense for the word, the word is assigned the default value of "nil". The concept sense "nil" is a place holder and does not serve any other functions.

A concept identifier (CID) is set to the text of the word, for the specific concept identifier (CID), at block 222. At block 224, the concept count for this new concept identifier is set to 1. The concept identifier (CID), developed at block 220, is now added or placed into to the list of concept identifiers (CIDs), such as the list 110, at block 226. The process moves to block 230.

At block 230, the words with their concept senses, corresponding concept identifiers (CIDs) and concept counts, are now collated into a list, such as a completed list for the sentence, such as the list 110.

The list 110 is now subject to the process of box 112, where concept links are generated. The process of box 112, is shown in detail in the flow diagram of FIGS. 7A and 7B, to which attention is now directed.

At block 250, the concept list, such as the list 110, is received. This list 110 includes the concepts, concept senses, concept identifiers and concept counts, as detailed above. Concept counts are typically used to classify existing words into parts of speech not traditionally associated with these words, but whose usage may have changed in accordance with contemporary language.

The concept identifiers (CIDs) for each concept are linked in accordance with their pairing in the parse, and their link types or relational connectors (as assigned by the LGP), at block 252. Also, in block 252, the concept identifiers are linked in ordered pairs, for example (CIDX, CIDY), such that the left concept identifier, CIDX, is the start concept, and the right concept identifier, CIDY, is the end concept.

The process moves to block 254, where each set of ordered concept identifier (CID) pairs and their corresponding link type (relational connector), are provided as a query to the structured representation (SR) 42*a* for a prior existence of a corresponding normalized concept link. At block 256, a decision is made whether or not the requisite concept identifier (CID) pair and its link type (relational connector), have a corresponding start concept, end concept, and link type, for a concept link in the structured representation (SR) 42*a*.

If the concept pair matches a concept link in the structured representation (SR) 42*a*, the process moves to block 260. If the concept pair does not match any concept link in the structured representation (SR) 42*a*, the process moves to block 270.

At block 260, the concept link exists in the structured representation (SR) 42*a*. Accordingly, the concept link is returned to or placed into a concept link identifier (CLID) list 114, with the existing concept link identifier (CLID). The concept link count in the database, for example, the data store 42 or storage media linked thereto, for this existing concept link identifier (CLID) is increased by 1, at block 262. The process now moves to block 290.

Turning to block 270, the concept pair and link type do not exist as a concept link in the structured representation (SR) 42a. Accordingly, the concept pair and link type, are assigned the next available concept link identifier (CLID). This new concept link identifier (CLID) is assigned typically in ascending sequential order. At block 272, the start concept identifier for this concept link identifier (CLID) is set to the concept identifier (CID) for the start concept in the concept list 110. At block 274, the end concept identifier for this concept link identifier (CLID) is set to the concept identifier (CID) for the end concept in the concept list 110.

The process moves to block 276, where the link type for this concept link identifier (CLID) is set to the link type from the parse. For example, the parse is in accordance with the table 106 (detailed above). This sub process at block 276 is optional. Accordingly, the process may move directly from block 274 to block 278, if desired.

The concept link identifier (CLID) count, for this concept link identifier (CLID) is set to "1", at block 278. The new concept link identifier (CLID) is placed into the list of concept link identifiers (CLIDs), such as the list 114, at block 280. The process moves to block 290.

At block 290, the concept link identifiers (CLIDs) with their corresponding concepts, concept senses, links types and concept links, are collated (arranged in a logical sequence, typically a first in, first out (FIFO) order) and provided as a completed list for the sentence, such as, for example, the list 114.

Each of the concept links of the list 114 is subject to validation, at box 116. Validation may use one or more processes. For example, the link validation process of box 116 may be performed by two functions, an IS_VALID_LINK function and a stop word function. The IS_VALID_LINK function and the stop word function are independent of each other. These functions are typically complimentary to each other.

The functions typically operate contemporaneous or near in time to each other. These functions can also operate on the list one after the other, with no particular order preferred. They can also operate simultaneously with respect to each other. Both functions are typically applied to the linked concepts of the list 114, before each link of the list 114 is placed into the resultant list, for example, the resultant list 118. However, it is preferred that both functions have been applied completely to the list 114, before the resultant list 118 has been completed.

The IS_VALID_LINK function is a process where concept links are determined to be valid or invalid. This function examines the concepts and their positions in the pair of linked concepts. This function is in accordance with three rules. These rules are as follows, in accordance with Boolean logic:

IF the end or second concept is a noun, THEN, make the concept link VALID; OR

IF the end or second concept is a verb, AND the start or first concept is a noun OR an adverb, THEN, make the concept link VALID; OR OTHERWISE, make the concept link INVALID.

If the end or right concept is a noun, the concept link is always valid. However, if the end or right concept is a verb, the start or left concept must be either a noun or adverb, for the concept link to be valid. Otherwise, the concept link is invalid.

The stop word function is a function that only invalidates concept links. Stop words include, for example, words or concepts including portions of words, symbols, characters, marks, as defined above, as "words", that based on their position, start concept or end concept, in the concept link, will either render the concept link valid or invalid. The stop words of the stop word function are provided in the Stop Word Table (or Table) of FIG. 8. In this Table, the stop words are listed as concepts.

Turning to an example, in the Table of FIG. 8, for an explanation of the Table, the word "a" is a concept. As indicated in the table, "a" is considered valid (VALID) in the start position (of an ordered pair of concepts) and invalid (INVALID) in the end position (of an ordered pair of concepts). This means that "a" is acceptable as the start concept of a concept link, but not acceptable as the end concept of concept link. If a concept link containing "a" in the start position is placed into a list, such as the list 118, it its validity value is not changed, since according to the Table, "a" is acceptable in the start position of a concept link. Alternatively, if "1a" appears in the end concept position of a link, that link is rendered invalid, based on the INVALID entry in the Stop Word Table of FIG. 8, for the concept "a".

Figure 10A:
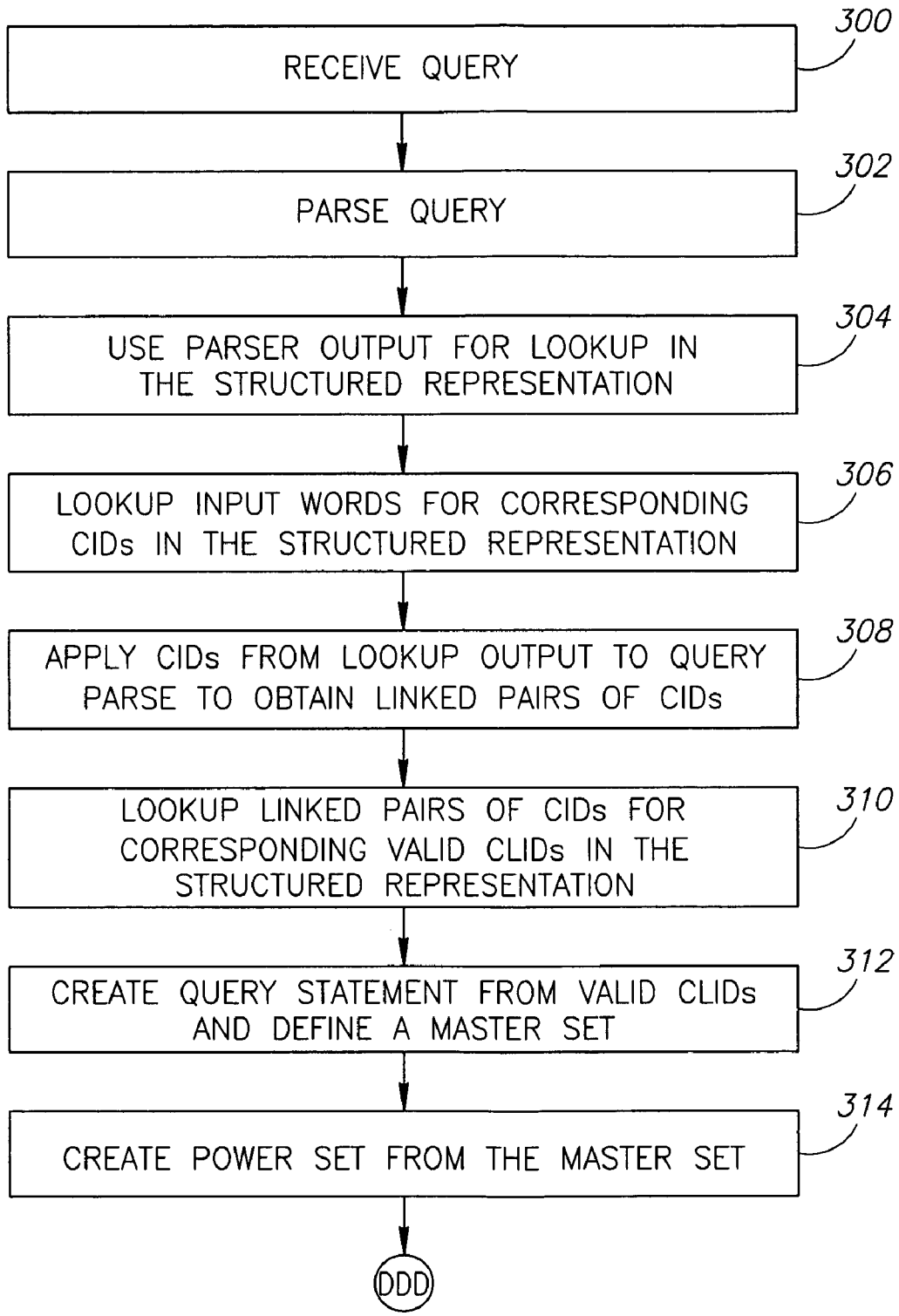
FIGS. 10A and 10B for a flow diagram of a process performed by the answer module in accordance with the present invention.
Figure 10B:
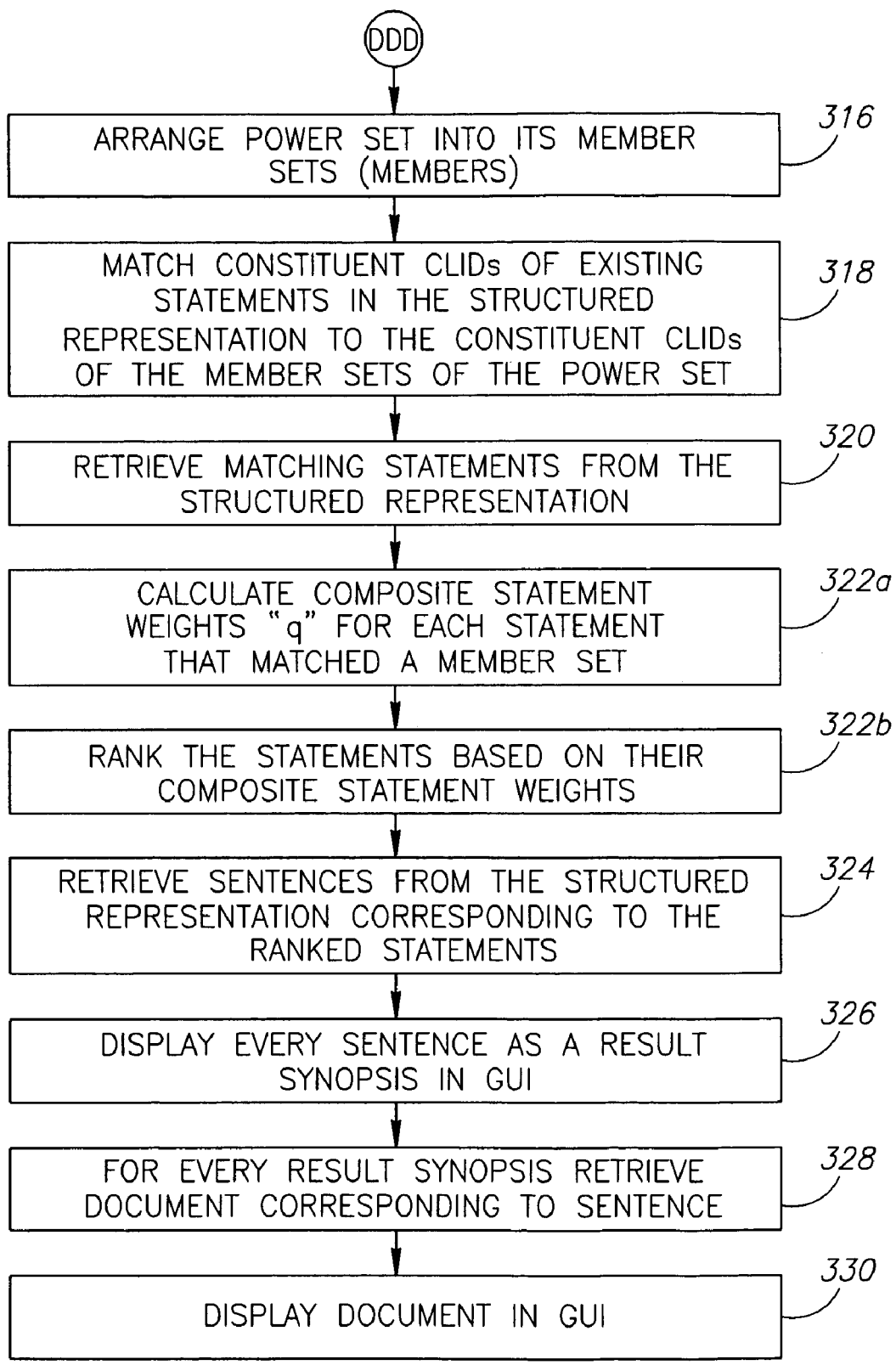

Concept links and their corresponding concept link identifiers (CLIDs), flagged as INVALID are maintained in the structured representation (SR) 42a. However, as detailed below, if this invalid concept link results from the parsed output of the query, the concept link identifier for an invalid concept link is not listed in the resultant query statement (blocks 310 and 312 of FIGS. 10A and 10B).

The concept links of the list 114 are then reformed into a list 118, with the concept links noted, for example, by being flagged, as either valid or invalid, as shown in the broken line box 119 (not part of the table 118 but shown for description purposes). These valid and invalid concept links are reexamined every time the link is seen. The concept link identifiers are then grouped to form a statement, at box 120. A "statement", as used in this document (as indicated above), is a set of concept links (concept link identifiers) that corresponds to a parse of a particular sentence (from its natural language). An exemplary statement formed from the list 118 is: {[CLID1] [CLID2] [CLID3] [CLID4] [CLID5]}, of box 120.

The statements represent syntactic relationships between the words in the sentences, and in particular, a collection of syntactic relationships between the words or concepts of the sentence from which they were taken. The statements, along with concepts, and concept links populate the structured representation (SR) 42a. The aforementioned process operates continuously on all of the sentences, for as long as necessary.

The concept links, and specifically, their corresponding concept link identifiers (CLIDs), are such that values are calculated for the concept link identifiers (CLIDs). These values are used to provide weights to statements or "statement weights", as part of a ranking process to determine the most relevant statements, in response to an inputted query. The ranking process facilitates extraction of the most relevant statements, and in particular, a single most relevant statement, to respond to the inputted query. The process for calculating values for each concept link identifier (CLID) is as follows.

From FIG. 4, the normalized document 80 has been separated into attributes 81-87, including content 90. For example, the attributes of Author 82, Publishing Source 83 and Publishing Class 84, and Date 86, are used in this exemplary operation. Other attributes may be used in accordance with the description below, depending on the application desired. Example values for the attributes of Author 82, Publishing Source 83, and Publishing Class 84 are listed in the Authority Table of FIG. 13. These values are programmed into the system by the administrator, and may be changed as desired, with additional values added, and values removed as desired. Values for Author 82, Publishing Source 83, and Publishing Class 84, may range from 100 to 0, with the value of zero (0), also serving as the default value ("DEF") for these three attributes.

Remaining in the Authority Table of FIG. 13, exemplary values for the Author attribute 82, may be: a news author like Stephen A. Smith, who, for example, is assigned the value 65, a famous author, for example, Thomas Friedman or George Will, who, for example, are assigned values of 35, Mr. X, assigned the value 10, Miss Y, assigned the value of 5, and the default (DEF), if the document author is not provided in the aforementioned list, or the document lacks an author, of 0.

Turning to the Publishing Source attribute 83, Encyclopedias, for example, Encyclopedia Britannica® (ENCB) or the World Book® Encyclopedia (ENCW), have been assigned the value 95, while the Wikipedia (WP) (an encyclopedia available on the World Wide Web at www.wikipedia.com), has been assigned the value 50. A news source, such as The New York Times (NYT) has been assigned the value 45, Sports Illustrated Magazine (SI) has been assigned 40, Cable News Network (CNN) has been assigned 35 and Fox News (FOX) has been assigned 15. Also, a blog from Mr. X (BLOGX) has been assigned 5, a blog from Miss Y (BLOGY) has been assigned 3, and the default (DEF), if there is not a publishing source as listed in the Authority Table, or if the document lacks a publishing source, is 0.

For the Publishing Class attribute 84, Encyclopedias (ENC) have been assigned 95, Known News Sources (KNS) have been assigned 80, and Blogs (BLOG) have been assigned 30. The default (DEF), if there is not a publishing class for the article, or if the publishing class is not listed in the Authority Table, is 0.

The values assigned above, for Author 82, Publishing Source 83, and Publishing Class 84, are "user adjustable weights" and are assigned to all normalized documents (for example, in accordance with the document 80). Each "user adjustable weight" is divided by 100 to determine user adjustable weight coefficients for each normalized document, expressed as x, y and z, where:

x is any value, expressed as $0 \leq x \leq 1$, and represents the author authority coefficient;

y is any value, expressed as $0 \leq y \leq 1$, and represents the publishing class coefficient; and, z is any value, expressed as $0 \leq z \leq 1$, and represents the publishing source coefficient.

These coefficients, x, y, and z, are applicable to the constituent statements from each of the respective documents from which they originate (are derived). Accordingly, these coefficients, x, y and z, are used to provide a weight, also known as an authority weight, to each document based on the reliability and credibility of its source.

Figure 16:
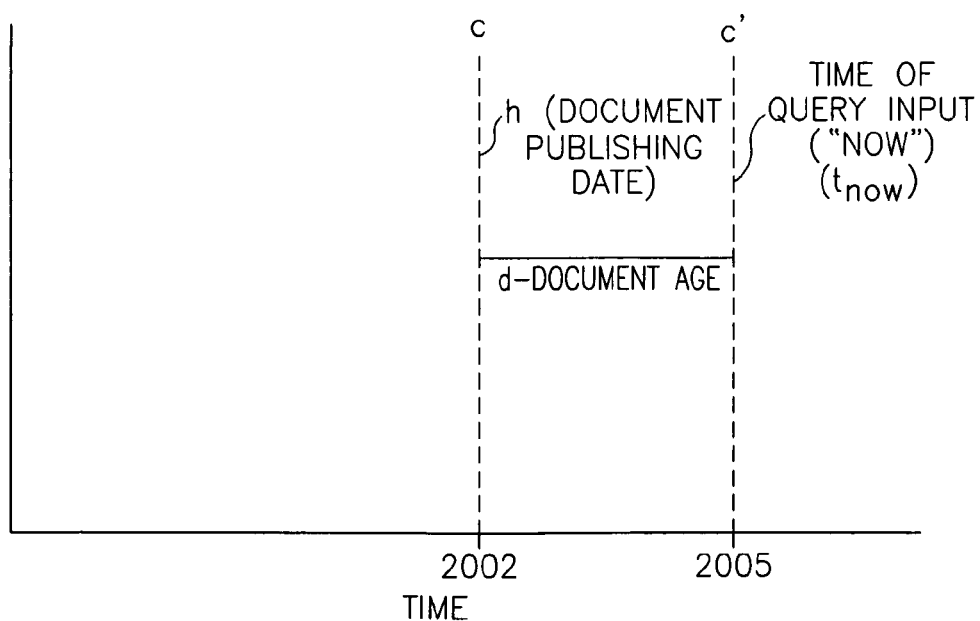

The date attribute 86 from the normalized document 80, provides document date. If the document 80, includes a date, this date is used as the document date. Otherwise, as a default, the document date is the date corresponding to the date of a timestamp. A timestamp is the current time of an event as recorded by a computer, here the document module (D) 64. A timestamp is assigned to the normalized document when it is inserted into the system (the document module (D) 64). The document publishing date (or document creation date) is assigned the value "h", and is illustrated in FIG. 16. Unlike x, y, and z, the value h is not a user adjustable weight.

For each concept link identifier (CLID), two other variables are also used, and are represented by the subscript "i". These variables are as follows:

$l_i$, the concept link identifier (CLID) count, from 1 to infinity, $k_i$, the weight assigned to each relational connector for the paired concepts from which the respective concept link identifier (CLID) was created from the LGP parse, expressed as $0 < k_i < 1$, with values for all relational connectors from the LGP parse listed in the Link Weight Tables of FIG. 14; and, m, the total number of concept link identifiers (CLIDs), at a particular time, as represented by the subscript "t".

The values of $l_i$, $k_i$, and m, are taken at any given time. Additionally, the values of $l_i$ and $k_i$ are variable, and dependent on the individual concept link identifier (CLID) and the time (t).

Values for each of the concept link identifiers (CLIDs) are now determined. For each concept link identifier (CLID), a value "$c_{i,t}$", which represents the relative occurrence for concept link identifiers (CLIDs) (each individual concept link identifier (CLID) represented by the subscript "i", at a time, represented by the subscript "t", is calculated in accordance with the formula:

$$c_{i,t} = \frac{l_i}{\sum_{j=1}^{n_t} l_j} = \frac{l_i}{m_t}$$

where, $n_t$ is the total number of concept link identifiers (CLIDs) in the system at a time (t);

j is an index variable; and, $$\sum_{j=1}^{n_t} l_j$$

is the sum of the count of concept link identifiers (CLIDs) for all concept link identifiers (CLIDs) at time (t), expressed as $m_t$.

For each concept link identifier (CLID), two instances of the relative occurrence, expressed as $c_{i,t}$ are calculated. First, the relative occurrence "c" is calculated at the time the last concept link identifier (CLID) was inserted (entered) into the system, represented as $t_{insert}$; and, second, the relative occurrence "c'" is calculated at a query time, for example, now, when the query is made, represented as $t_{now}$.

The relative occurrence at the last insertion "c" is calculated in accordance with the following formula:

$$c = c_{i,t_{insert}} = \frac{l_i}{\sum_{j=1}^{n_{insert}} l_j} = \frac{l_i}{m_{t_{insert}}}$$

where, $l_i$ is the count for a given concept link identifier (CLID) "i", at a given time (here, for example, time $t_{insert}$);

$m_{t_{insert}}$ is the sum of the counts for all of the concept link identifiers (CLIDs) in the system at a given time (here, for example, time $t_{insert}$); and, $n_{tinsert}$, is an upper limit for the total number of concept link identifiers (CLIDs) in the system.

The relative occurrence at the query time "c'", for the concept link identifier (CLID) indexed by "i", is calculated in accordance with the following formula:

$$c' = c_{i,t_{now}} = \frac{l_i}{\sum_{j=1}^{n_{t_{now}}} l_j} = \frac{l_i}{m_{t_{now}}}$$

where, $l_i$ is the count for a given concept link identifier (CLID) at a given time (here, for example, time $t_{now}$);

$m_{now}$ is the sum of the counts for all of the concept link identifiers (CLIDs) in the system at a given time (here, for example, time $t_{now}$); and $n_{now}$ is an upper limit for the total number of concept link identifiers (CLIDs) in the system.

A relevancy coefficient "$a_i$", for each concept link identifier (CLID), is generated in accordance with the values of "c" and "c'", by applying the following formula:

$a_i = c'/x$ and, applying the formulae, as listed above, the calculation is as follows:

$$a_i = \frac{c'}{c} = \frac{c_{i,t_{now}}}{c_{i,t_{insert}}} = \frac{\frac{l_i}{\sum_{j=1}^{n_{t_{now}}} l_j}}{\frac{l_i}{\sum_{j=1}^{n_{t_{insert}}} l_j}} = \frac{\sum_{j=1}^{n_{t_{insert}}} l_j}{\sum_{j=1}^{n_{t_{now}}} l_j} = \frac{m_{t_{insert}}}{m_{t_{now}}}$$

With the relevancy coefficient "a" determined, the weight (w) for each concept link identifier (CLID) is determined by the following formula:

$w_i = l_i \cdot a_i \cdot k_i$ where, $l_i$ and $a_i$ are determined as above, and $k_i$ is determined in accordance with the following rules and the Link Weight Tables of FIG. 14.

Initially, the relational connector for the concept link identifier (CLID) from the LGP, is compared to the link type in Table 14-1: Non-Major Link Type Weights. If there is not an exact match, the relational connector for the concept link identifier (CLID) is compared against the link types in Table 14-2: Major Link Type Weights. If there is a match, $k_i$ is assigned the link weight value for the matching link type. If there is not a match, $k_i$ is assigned the default value of 0.51.

Figure 15:
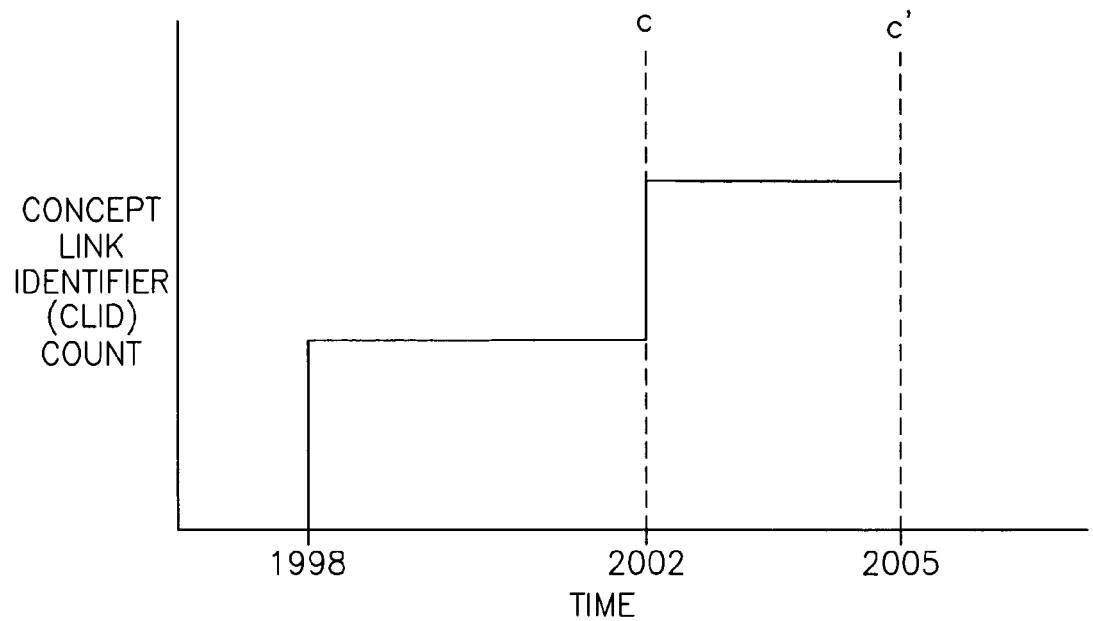
FIG. 15 is a diagram showing concept link identifiers (CLIDs) being added to the system over time; and, FIG. 16 is a diagram showing the variables associated with determining the age of a document.

For example, turning to FIG. 15, there is a chart of concept link identifier (CLID) counts for a single concept link identifier, for example, Dr. P. Dr. P was first mentioned in 1998. He again became newsworthy in 2002, but after 2002, was out of the news. Accordingly, the count for the concept link identifier for "Dr. P", jumps in 1998, plateaus until 2002, where it rises again, and again plateaus to 2005, the present time. Accordingly, the relative occurrence "c" at the time the last concept link identifier was inserted (entered) into the system, represented as $t_{insert}$ is represented by the broken line at 1998, and the relative occurrence "c'" at a query time, for example, now, when the query is made, represented as $t_{now}$, is represented by the broken line at 2005.

Figure 9:
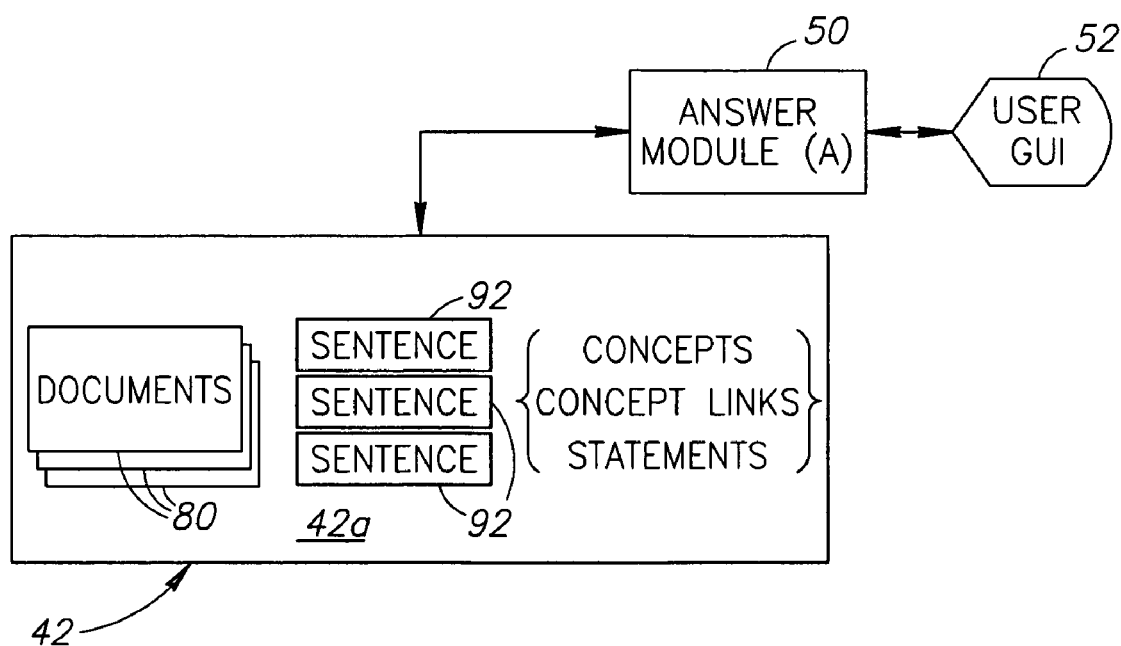
FIG. 9 is a schematic diagram of the architecture for the operation of the answer module of the architecture of FIG. 2.

Attention is now directed to FIG. 9, an operational schematic diagram of the answer side of the architecture 40. The answer module (A) 50, takes a query submitted by a user, through an interface, such as a GUI 52. The answer module (A) 50 processes the query and extracts the important linguistic structures from it. In performing the processing, the answer module (A) 50 creates relational components of the query, that are based on the relationships of the words to each other in natural language, in the query. Within the answer module (A) 50 is a parser, for example, the above described LGP.

The parser, for example, the LGP, extracts linguistic structures from the query, and outputs the query, similar to that detailed above, for the database population side. The answer module (A) 50 then requests from the data store 42, sentences and their associated documents, that contain the linguistic structures just extracted. These extracted linguistic structures, encompass answers, that are then ranked in accordance with processes detailed below. Finally, the answer module (A) 50 sends the answers to the GUI 52 associated with the user who submitted the query, for its presentation to the user, typically on the monitor or other device (PDA, iPAQ, cellular telephone, or the like), associated with the user.

Turning also to FIGS. 10A, 10B, and 11A-11C, an exemplary process performed by the answer module (A) 50 in the server 20 (and associated architecture 40) is now detailed. Initially, the data store 42, and its structured representation (SR) 42a, has been populated with data, for example, statements, concepts and concept links concepts, as detailed above, and for purposes of explanation, such as that shown in FIGS. 5A-8 and detailed above.

The answer module (A) 50 receives a query, entered by a user or the like, in natural language, through an interface, such as the GUI 52, at block 300. An exemplary query may be, "What is the current security level?"

The answer module (A) 50 utilizes the LGP to parse the query at block 302. The output of parsing by the LGP is in accordance with the parsing detailed above, and is shown for example, in FIG. 11A. An exemplary parse of the question would yield the words "what", "is", "the", "current", "security" and "level", including concept senses and links between the words, as shown in the Table of FIG. 11B.

Figures 11A, 11B, 11C:
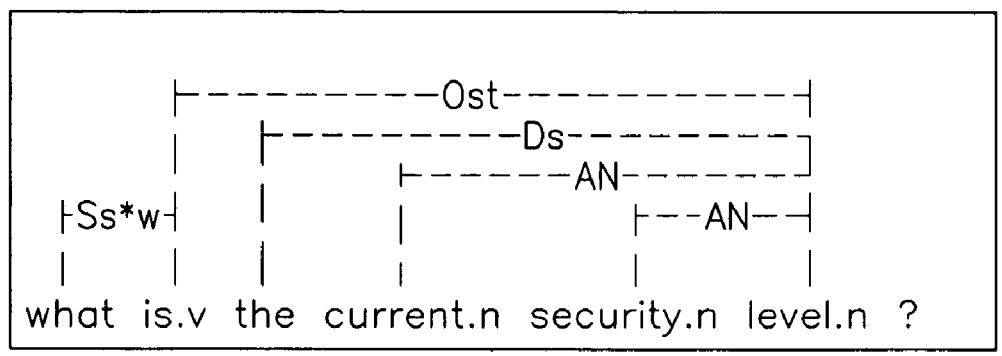
FIGS. 11A-11C are tables illustrating various exemplary results of sub processes of FIGS. 10A and 10B.

The parser output, for example, as per the Table of FIG. 11B, is used for lookup in the structured representation (SR) 42a of the data store 42, for concept identifiers, at block 304. Also in block 304, words of the output are matched with previously determined concept identifiers of the structured representation (SR) 42a. In block 306, the words and their concept senses that form the list (or portions of words and their labels) are assigned concept identifiers (CIDs), in accordance with the concept identifiers (CIDs) that have been used to populate the structured representation (SR) 42a of the data store 42. However, if an inputted word of the query does not have an existing corresponding concept identifier, a concept identifier is not returned, and if part of a linked pair, the pair will not receive a concept link identifier (CLID).

The inputted words, having been assigned concept identifiers (CIDs), are linked in pairs, as per the query parse (FIGS. 11A and 11B), at block 308. For example, the former word and now concept "is" receives CID5. Similarly, "the" receives CID1, "current" receives CID3, "security" receives CID4 and "level" receives CID2.

The linked pairs of concept identifiers are then subject to lookup for corresponding valid concept link identifiers (CLIDs) in the structured representation (SR) 42a of the data store 42, at block 310. For example, this sub process would yield the valid concept link identifiers CLID9, CLID1, CLID2 and CLID3, from the table of FIG. 11C. For example, CLID8 was designated invalid upon populating the data store 42, for example, at box 116 of FIGS. 5A and 5B. (For example, CLID8 and CLID9 were also in the structured representation (SR) 42a, previously stored in the data store 42).

A query statement from the valid concept link identifiers is created at block 312. Throughout this document (as indicated above), a query statement is a set of concept links (concept link identifiers) that correspond to the parse of the query. For example, the query statement from the concept link identifiers is as follows: [CLID9] [CLID1] [CLID2] [CLID3]. The statement represents syntactic relationships between the words in the query, and in particular, a collection of syntactic relationships between the words.

All of the valid concept link identifiers (CLIDs) from the query statement, define a master set, expressed as {[CLID9], [CLID1], [CLID2], [CLID3]}, also at block 312. A power set is created from the master set, at block 314. The "power set", as used herein (as indicated above) is written as the function P(S), representative of the set of all subsets of "S", where "S" is the master set. Accordingly, if the query statement includes four concept link identifiers (CLIDs), the size of "S" is 4 and the size of the power set of "S" (i.e., P(S)) is $2^4$ or 16.

At block 316, the power set from the master set (from the query statement): {[CLID9], [CLID1], [CLID2], [CLID3]}, is as follows: {{[CLID9], [CLID1], [CLID2], [CLID3]}, {[CLID9], [CLID1], [CLID2]}, {[CLID9], [CLID1], [CLID3]}, {[CLID9], [CLID2], [CLID3]}, {[CLID1], [CLID2], [CLID3]}, {[CLID9], [CLID1]}, {[CLID9], [CLID2]}, {[CLID9], [CLID3]}, {[CLID1], [CLID2]}, {[CLID1], [CLID3]}, {[CLID2], [CLID3]}, {[CLID9]}, {[CLID1]}, {[CLID2]}, {[CLID3]}, { }}.

The power set is further broken down into individual member sets or members. The member sets (members) typically do not include the empty set.

Also in block 316, in an optional sub process, the members (individual sets) of the power set are arranged in order of their degree. Throughout this document (as indicated above), "degree" or "degrees" refer(s) to the number of concept links in a set. The members of the power set are typically ranked by degree in this manner. In this case, for a query statement with four concept link identifiers (CLIDs), degree 4 is the highest rank, as it includes four concept link identifiers (CLIDs) in this particular collection. Similarly, degree 1 is the lowest, as it includes one concept link identifier (CLID) per collection. While the empty set, of degree zero, is a member of the power set, it is typically not used when arranging the power set.

The power set consists of subsets of the master set, that are ordered by degree and ranked in accordance with the following table:

| | |
|---|---|
| Degree 4 | {[CLID9], [CLID1], [CLID2], [CLID3]} |
| Degree 3 | {[CLID9], [CLID1], [CLID2]}, {[CLID9], [CLID1], [CLID3]}, {[CLID9], [CLID2], [CLID3]}, {[CLID1], [CLID2], [CLID3]} |
| Degree 2 | {[CLID9], [CLID1]}, {[CLID9], [CLID2]}, {[CLID9], [CLID3]}, {[CLID1], [CLID2]}, {[CLID1], [CLID3]}, {[CLID2], [CLID3]} |
| Degree 1 | {[CLID9]}, {[CLID1]}, {[CLID2]}, {[CLID3]} |

The members in the power set are now matched against the statements in the structured representation (SR) 42a, by comparing their concept link identifiers (CLIDs), at block 318.

For example, the comparison starts with analysis of the highest (degree 4) member, and goes in descending sequential order, to the lowest (degree 1) member. The answer module (A) 50 performs a comparator function that compares concept link identifiers (CLIDs) in the statements to the concept link identifiers (CLIDs) of the members of the power set, and a matching function, determining if there is a match between the all of the concept link identifiers (CLIDs) of any of the members of the power set, and one or more concept link identifiers (CLIDs) in the statements of the structured representation (SR) 42a. If a statement (from the structured representation (SR) 42a) contains all of the concept link identifiers (CLIDs), that are also contained in a member of the power set, there is a "match", and the statement is not examined or used again. A statement matching a set of degree 4 will be a statement with four matching concept link identifiers, although the statement may include more than four concept link identifiers (CLIDs). Similarly, a statement matching a set of degree 3, degree 2 or degree 1, would be determined in the same manner.

The matching statements are retrieved or pulled from the structured representation (SR) 42a by the answer module (A) 50, at block 320.

Composite statement weights, represented by "q", are then calculated for each statement with at least one concept link identifier (CLID) that matches the concept link identifiers (CLIDs) in the member sets, at block 322a. In block 322a, for each of the matching statements from the structured representation (SR) 42a, there is calculated a base statement weight "s". The calculation is based on the concept link identifiers (CLIDs) from the statements of the structured representation (SR) 42a, that match the concept link identifiers (CLIDs) of the respective members of the power set. The values for all of the weights "$w_j$" for all of the matching concept link identifiers (CLIDs) in each statement are summed, in accordance with the formula:

$$s = \sum_{j=1}^{n} w_j$$

where, n is the degree of the member of the power set.

Accordingly, where n=4, there are four matching concept link identifiers (CLIDs), such that four values for four corresponding concept link identifiers (CLIDs) are summed in the formula above.

With the base statement weights "s" determined, the user adjustable weights, x, y, and z, are collected and a composite statement weight "q", for each matching statement is determined in accordance with the formula:

$$q = s \cdot (x+1) \cdot (y+1) \cdot (z+1)/(d+1)$$

where, d is the age of the document, typically in days, that may also be expressed as hours, minutes, seconds, and other time units. The document age is typically based on the assumption that newer documents are more relevant than older documents, when a response to a query is sought. "d" is defined in accordance with the formula:

$$d = t_{now} - h;$$

where, $t_{now}$ is the query time; and h is the document publishing date, and, the expression $(x+1) \cdot (y+1) \cdot (z+1)$ is an authority value (av), corresponding to the reliability or credibility of the document from which the user adjustable weights, x, y and z, were taken.

Turning also to FIG. 16, "h", the document publishing date, and now, the query time ($t_{now}$), are illustrated graphically.

The statements with the greatest value for composite statement weight "q" are isolated. These isolated statements are typically ranked in accordance with their statement weights, or "q" values, at block 322b.

For example, the base statement weight "s" is calculated, as detailed above. Turning to FIG. 13, if the statement came from a news article, for example, from CNN, written by Stephen A. Smith, the value for x is $^{65}/_{100}$ or 0.65. The value for y, the publishing source is $^{35}/_{100}$ or 0.35. The value for z, the publishing class is $^{80}/_{100}$, or 0.8, whereby the "q" value for this statement from an authored news article from CNN is expressed as:

$$q=s\cdot(0.65+1)\cdot(0.35+1)\cdot(0.8+1)/(d+1)$$

Should the article from CNN not have an author, x takes the default value 0, whereby x is $^{0}/_{100}$ or 0.0. Accordingly the statement weight or "q" value of a statement from this article is expressed as:

$$q=s\cdot(0.0+1)\cdot(0.35+1)\cdot(0.8+1)/(d+1)$$

Typically, the highest ranked result, the isolated statement with the greatest composite weight or "q" value, is returned as the first result. Additional results may also be returned, based on their ranked order.

Alternately, if there are not any matches, a result may not be returned.

Sentences, corresponding to the retrieved and/or isolated statements, are retrieved from the structured representation (SR) 42a, at block 324. At block 326, each retrieved sentence is displayed on the GUI 52 as a result synopsis (in accordance with the weight or rank (by weight) of its corresponding statement). A document is retrieved for every result synopsis selected by the user or the like, from which the sentence is a part of, at block 328. The document is ultimately displayed in the GUI 52, at block 330. A hypertext link for the document may also appear on the GUI 52.

Alternately, the priority of statements may be based on the degree of the statement, in accordance with the optional sub process detailed above for block 316. For example, a degree 4 (n=4) statement will be ranked higher, than a degree 3 (n=3) statement, a degree 2 (n=2) statement, and a degree 1 (n=1) statement. The composite statement weight, or "q" value, is used to prioritize statements of the same degree, to determine the highest priority statement within the particular degree. The determination of the "q" value is in accordance with the process detailed above.

Figure 12:
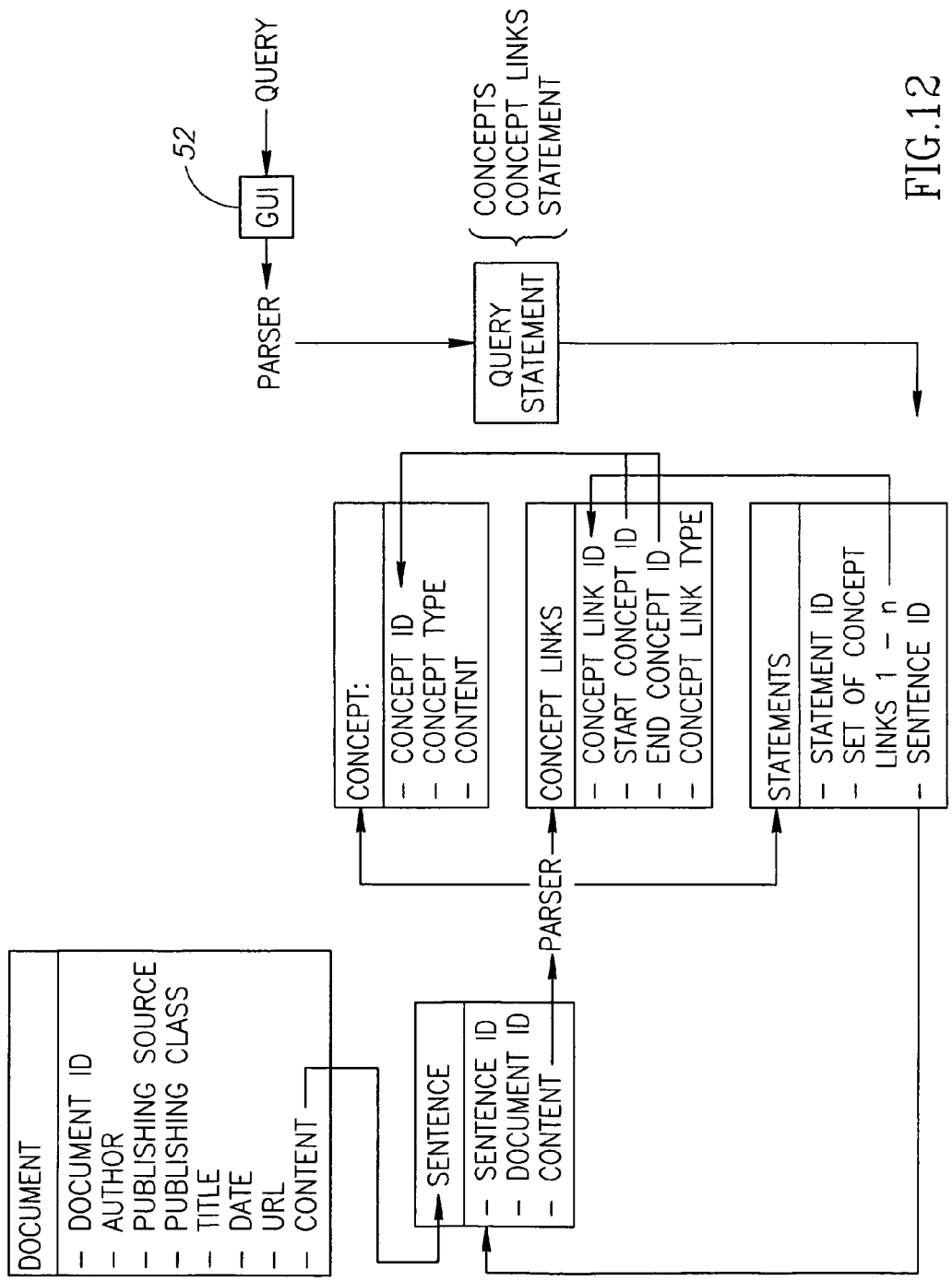
FIG. 12 is a diagram of the data structure for the system of the invention.

FIG. 12 shows a chart of a statement ultimately leading to sentences and documents, as per blocks 324, 326 and 328. Once a statement has been determined to be the result. A lookup is performed on the structured representation (SR) 42, to retrieve the sentence corresponding to the statement. There is a one to one relation between statements and sentences. The sentences are then used to identify the document from which they came.

The above-described processes including portions thereof can be performed by software, hardware and combinations thereof. These processes and portions thereof can be performed by computers, computer-type devices, workstations, processors, micro-processors, other electronic searching tools and memory and other storage-type devices associated therewith. The processes and portions thereof can also be embodied in programmable storage devices, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

While preferred embodiments of the present invention have been described, so as to enable one of skill in the art to practice the present invention, the preceding description is intended to be exemplary only. It should not be used to limit the scope of the invention, which should be determined by reference to the following claims.

What is claimed is:

1. A method for providing data to a user in response to a query comprising:
    creating related pairs of words from at least one document in a corpus by isolating sentences from the at least one document and parsing the words from each sentence into pairs of words based on a plurality of predetermined relationships, the related pairs comprising words that are not adjacent to each other;
    assigning a concept identifier to each word of each related pair of words based on an identified one of the plurality of predetermined relationships;
    creating pairs of concept identifiers by applying the assigned concept identifiers to each word in each related pair of words;
    assigning concept link identifiers to each pair of concept identifiers;
    calculating a relevance value for each concept link identifier as a function of a time the concept link identifier was assigned;
    assigning a weight to each concept identifier as a function of the calculated relevancy value;
    receiving a query statement from the user, the query comprising a plurality of words related to a topic of interest to the user;
    creating other related pairs of words from the plurality of words in the query based on the plurality of predetermined relationships, the other related pairs comprising words that are not adjacent to each other;
    assigning another concept identifier to each word of each other related pair of words based on the identified predetermined relationship;
    creating pairs of the other concept identifiers by applying the assigned other concept identifiers to each word in each other related pair of words;
    assigning other concept link identifiers to each pair of the other concept identifiers;
    comparing the other concept link identifiers to the concept link identifiers to identify concept identifiers corresponding to a particular isolated sentence in the at least one document having the greatest weight; and
    providing the corresponding isolated sentence to the user.

2. The method of claim 1 additionally comprising: creating statements by combining the concept link identifiers from each of the isolated sentences.

3. The method of claim 2, additionally comprising: storing the statements in at least one data store.

4. The method of claim 3, additionally comprising,
    combining all of the other concept link identifiers into a query statement.

5. The method of claim 4, wherein all of the other concept link identifiers of the query statement define a master set, where N is the number of other concept link identifiers in the master set; and, creating a plurality of subsets from the master set, each subset of the plurality of subsets including at least one member of N concept link identifiers and at least N members of one concept link identifier.

6. The method of claim 5, wherein the creating other related pairs of words includes, parsing the query in a parser.

7. The method of claim 5, additionally comprising: analyzing a plurality of stored statements with the plurality of subsets, including, determining matches of the concept link identifiers in the stored statements with all of the other concept link identifiers in each of the subsets, and isolating the stored statements where at least one concept link identifier matches at least one other concept link identifier in at least one subset of the plurality of subsets.

8. The method of claim 7, additionally comprising: calculating the weight of each of the isolated statements.

9. The method of claim 8, wherein calculating the weight of each of the isolated statements, includes, applying a function based on: the value of the sum of the relevancy values for the matching concept link identifiers; the authority ranking for the document from which the isolated statement was derived; and the age of the document from which the concept link identifiers were derived, to each of the isolated statements.

10. The method of claim 9, wherein the isolated statement of the greatest weight is determined to be a response to the query.

11. The method of claim 10, wherein the isolated statement of the greatest weight corresponds to at least one sentence of at least one document, and, the at least one sentence is returned to a predetermined location.

12. A method for providing at least one response to at least one query in natural language, comprising:
    populating a data store by obtaining documents from at least a portion of a corpus, isolating sentences from the documents, parsing the sentences into linked pairs of words in accordance with predetermined relationships, the linked pair of words comprising words that are not adjacent to each other, assigning concept identifiers to each word of the linked pair of words, assigning concept link identifiers to each pair of concept identifiers corresponding to each linked pair of words, and, combining the concept link identifiers for each sentence into a statement;
    receiving an inputted query in natural language;
    parsing the query into other linked pairs of words in accordance with predetermined relationships, the other linked pair of words comprising words that are not adjacent to each other, assigning other concept identifiers to each word of the other linked pair of words, assigning other concept link identifiers to each pair of other concept identifiers corresponding to each other linked pair of words, determining values for each of the other concept link identifiers, and, combining the other concept link identifiers into a query statement;
    analyzing the other concept link identifiers included in the query statement and the concept link identifiers included in the statements in the data store to identify matches;
    isolating statements in the data store having at least one concept link identifier that matches at least one other concept link identifier in the query statement;
    calculating a relevance value for each concept link identifier in each of the isolated statements as a function of a time the query is received;
    calculating the weight of each of the isolated statements from the data store as a function of the relevance value of each concept link identifier included therein;
    providing at least one response to the query, the at least one response including at least one sentence corresponding to the isolated statement from the data store having the greatest weight.

13. The method of claim 12, additionally comprising: providing access to at least one document from which the at least one sentence was isolated.

14. The method of claim 12, wherein the predetermined relationships are defined by a parser.

15. The method of claim 12, wherein assigning other concept identifiers to each word of the query includes, performing a lookup in the data store for the concept identifier matching the word from the query.

16. The method of claim 15, wherein assigning other concept link identifiers includes, performing a lookup in the data store for paired concept identifiers matching the paired other concept identifiers from the query.

17. A computerized system for providing at least one response to a query, the system comprising:
    a processor comprising modules executable on the processor, the modules comprising:
    a first module configured for:
        obtaining at least one document from at least a portion of a corpus;
        isolating sentences from the at least one document;
        creating pairs of words from each of the sentences, each pair of words corresponding to a concept link identifier and each pair of words comprising words that are not adjacent to each other; and,
        creating a statement from at least one concept link identifier from each sentence;
    a second module configured for:
        receiving at least one query;
        creating a query statement by creating other pairs of words from the words that form the at least one query, each other pair of words corresponding to another concept link identifier, and, the query statement including at least one other concept link identifier;
        isolating statements having at least one concept link identifier matching at least one other concept link identifier of the query statement;
        calculating a relevance value for each concept link identifier in each of the isolated statements as a function of a time the at least one query is received;
        calculating weights for each of the isolated statements as a function of the relevance value of each concept link identifier included therein; and,
        providing at least one sentence corresponding to the statement of the greatest weight as the at least one response to the at least one query.

18. The system of claim 17, additionally comprising: a data store in communication with the first module and the second module, for storing statements formed from at least one concept link identifier from each sentence.

19. The system of claim 17, wherein the second module configured for calculating weights for each of the isolated statements, includes means for: calculating a weight (s) for the statement based on the sum of values for the matching concept link identifiers, calculating a value for the authority (av) of the document from which the isolated statement was derived, and, calculating a value for the age (d) of the document.

20. The system of claim 17, wherein the first module configured for creating the pairs of words from the sentences isolated from the at least one document includes, a parser for parsing each sentence and linking the words of each pair of words from each parsed sentence in accordance with predetermined relationships.

21. The system of claim 17, wherein the second module configured for creating the other pairs of words that form the at least one query includes, a parser for parsing the at least one query, and linking the words of each other pair of words from the parsed at least one query in accordance with predetermined relationships.

22. The system of claim 17, wherein the first module additionally includes programmable means through which values corresponding to at least one attribute of a document may be entered.

23. The system of claim 22, wherein the at least one attribute of a document includes a plurality of attributes.

24. The system of claim 23, wherein the plurality of attributes of a document are selected from the group consisting of: author, publishing source, and, publishing class.

25. A programmable storage device readable by a machine, storing a program of instructions executable by a machine to perform method steps for providing responses to a query, the method steps selectively executed during the time when the program of instructions is executed on the machine comprising:

populating a data store by obtaining documents from at least a portion of a corpus, isolating sentences from the documents, parsing the sentences into linked pairs of words in accordance with predetermined relationships, the linked pair of words comprising words that are not adjacent to each other, assigning concept identifiers to each word of the linked pair of words, assigning concept link identifiers to each pair of concept identifiers corresponding to each linked pair of words, and, combining the concept link identifiers for each sentence into a statement;

receiving an inputted query in natural language;

parsing the query into other linked pairs of words in accordance with predetermined relationships, the other linked pair of words comprising words that are not adjacent to each other, assigning other concept identifiers to each word of the other linked pair of words, assigning other concept link identifiers to each pair of other concept identifiers corresponding to each other linked pair of words, determining values for each of the other concept link identifiers, and, combining the other concept link identifiers into a query statement;

analyzing the other concept link identifiers included in the query statement and the concept link identifiers included in the statements in the data store to identify matches;

isolating statements in the data store having at least one concept link identifier that matches at least one other concept link identifier in the query statement;

calculating a relevance value for each concept link identifier in each of the isolated statements as a function of a time the query is received;

calculating the weight of each of the isolated statements from the data store as a function of the relevance value of each concept link identifier included therein; and providing at least one response to the query, the at least one response including at least one sentence corresponding to the isolated statement from the data store having the greatest weight.

26. The programmable storage device of claim 25, wherein the calculating the weight for each of the isolated statement includes: calculating a weight for at least one isolated statement as function of the authority of the document from which the statement was derived and the time relevance of the relationships of the words to each other in the at least one isolated statement.

27. The programmable storage device of claim 25, wherein the relationships of the words to each other in the isolated statement includes pairs of words, each pair of words defining a concept link identifier, and, calculating the weight (q) in accordance with the formula:

$$q = s * av/(d+1)$$

where, s is a weight for the statement based on the sum of values for a predetermined number of concept links in the statement;

av is the authority value of the document from which the statement was derived, and, d is the age of the document.

* * * * *

UNITED STATES PATENT AND TRADEMARK OFFICE
CERTIFICATE OF CORRECTION

PATENT NO. : 7,447,683 B2
APPLICATION NO. : 11/117186
DATED : November 4, 2008
INVENTOR(S) : Martin A. Quiroga et al.

It is certified that error appears in the above-identified patent and that said Letters Patent is hereby corrected as shown below:

Col. 8, line 30: "$(R_1-Rn)$" should read --$(R_1-R_n)$--

Col. 11, line 18: "are in described in" should read --are described in--

Col. 12, line 2: ""(CID)" was found" should read --(CID) found--

Col. 12, line 26: "placed into to the" should read --placed into the--

Col. 14, line 16: "concept of concept link" should read --concept of a concept link--

Col. 14, line 18: "it its" should read --its--

Col. 14, line 20: ""1a"" should read --"a"--

Col. 15, line 44: "$0<x<1$" should read --$0 \leq x \leq 1$--

Col. 15, line 46: "$0<y<1$" should read --$0 \leq y \leq 1$--

Col. 15, line 48: "$0<z<1$" should read --$0 \leq z \leq 1$--

Col. 17, line 21: "$ai = c'/x$" should read --$ai = c'/c$--

Col. 17, line 53: "Dr.P.Dr.P." should read --Dr. P.--

UNITED STATES PATENT AND TRADEMARK OFFICE
CERTIFICATE OF CORRECTION

PATENT NO. : 7,447,683 B2
APPLICATION NO. : 11/117186
DATED : November 4, 2008
INVENTOR(S) : Martin A. Quiroga et al.

It is certified that error appears in the above-identified patent and that said Letters Patent is hereby corrected as shown below:

Col. 20, line 2: "the all of the" should read --all of the--

Col. 21, line 45: "result. A lookup" should read --result, a lookup--

Col. 26, line 22, claim 26: "the calculating the" should read --calculating the--

Signed and Sealed this

Sixteenth Day of June, 2009

JOHN DOLL
*Acting Director of the United States Patent and Trademark Office*